(12) United States Patent
Jiang

(10) Patent No.: US 11,343,704 B2
(45) Date of Patent: May 24, 2022

(54) METHOD AND APPARATUS FOR ASSIGNING IDENTIFIER, BASE STATION AND USER EQUIPMENT

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 235 days.

(21) Appl. No.: 16/772,542

(22) PCT Filed: Dec. 21, 2017

(86) PCT No.: PCT/CN2017/117830
§ 371 (c)(1),
(2) Date: Jun. 12, 2020

(87) PCT Pub. No.: WO2019/119367
PCT Pub. Date: Jun. 27, 2019

(65) Prior Publication Data
US 2020/0389809 A1    Dec. 10, 2020

(51) Int. Cl.
*H04W 28/02* (2009.01)
*H04W 28/24* (2009.01)
*H04W 36/00* (2009.01)
*H04W 36/08* (2009.01)
*H04W 80/02* (2009.01)
*H04W 80/04* (2009.01)

(52) U.S. Cl.
CPC ....... *H04W 28/0268* (2013.01); *H04W 28/24* (2013.01); *H04W 36/0044* (2013.01); *H04W 36/08* (2013.01); *H04W 28/0263* (2013.01); *H04W 80/02* (2013.01); *H04W 80/04* (2013.01)

(58) Field of Classification Search
None
See application file for complete search history.

(56) References Cited

U.S. PATENT DOCUMENTS

| 2017/0324652 | A1 | 11/2017 | Lee et al. | |
| 2019/0029057 | A1* | 1/2019 | Pan | ........................ H04W 28/12 |
| 2019/0150023 | A1* | 5/2019 | Cho | .................. H04W 28/0268 370/235 |

FOREIGN PATENT DOCUMENTS

| CN | 107018542 A | 8/2017 |
| CN | 107493590 A | 12/2017 |

OTHER PUBLICATIONS

ISA State Intellectual Property Office of the People's Republic of China, Written Opinion of the International Searching Authority Issued in Application No. PCT/CN2017/117830, dated Sep. 7, 2018, WIPO, 9 pages.

(Continued)

*Primary Examiner* — Jutai Kao
(74) *Attorney, Agent, or Firm* — Finnegan, Henderson, Farabow, Garrett & Dunner, L.L.P.

(57) ABSTRACT

A method of assigning an identifier includes: assigning an AS QoS flow identifier to a current QoS flow; determining mapping relationship between an NAS QoS flow identifier and the AS QoS flow identifier; transmitting the mapping relationship and an SDAP PDU separately or simultaneously to UE, wherein an SDAP header of the SDAP PDU carries the AS QoS flow identifier assigned to the current QoS flow.

18 Claims, 13 Drawing Sheets

(56) References Cited

OTHER PUBLICATIONS

State Intellectual Property Office of the People's Republic of China, Office Action and Search Report Issued in Application No. 201780002318.5, dated May 18, 2021, 11 pages.
3GPP,"3rd Generation Partnership Project; Technical Specification Group Radio Access Network; NR; NR and NG-RAN Overall Description"; Stage 2 (Release 15), 3GPP TS 38.300 V1.2.1 (Nov. 2017), Nov. 2017, 56 pages.
3GPP,"3rd Generation Partnership Project; Technical Specification Group Services and System Aspects; System Architecture for the 5G System"; Stage 2, (Release 15), 3GPP TS 23.501 V1.5.0 (Nov. 2017), Nov. 2017, 170 pages.
Ericsson, "Issues with the Existing QoS Framework (Stage 3)", 3GPP TSG-RAN WG2 #100, Tdoc R2-1712920, Reno, Nevada, USA, Nov. 27-Dec. 1, 2017, 6 pages.
State Intellectual Property Office of the People's Republic of China, Office Action and Search Report issued in Application No. 201780002318.5, dated Sep. 1, 2020, 22 pages.
International Search Report of PCT Application No. PCT/CN2017/117830 from the State Intellectual Property Office of the P.R. China, Beijing, China, dated Sep. 7, 2018.
Huawei, HiSilicon, *Further discussion on SDAP Header Format*, R2-1712393, 3GPP TSG-RAN WG2#100 Meeting, Reno, Nevada, Nov. 27-Dec. 1, 2017, 5 pgs.
Ericsson, *SDAP entity establishment*, R2-1712922, 3GPP TSG-RAN WG2 #100, Reno, Nevada, Nov. 27-Dec. 1, 2017, 2 pgs.
MediaTek Inc., *SDAP header design based on NAS 5G QoS requirements*, R2-1712481, 3GPP TSG-RAN WG2#100, Reno, Nevada, Nov. 27-Dec. 1, 2017, 3 pgs.

* cited by examiner

METHOD AND APPARATUS FOR ASSIGNING IDENTIFIER, BASE STATION AND USER EQUIPMENT

CROSS REFERENCE TO RELATED APPLICATIONS

This application is a national phase application based on PCT/CN2017/117830, filed Dec. 21, 2017, the content of which is incorporated herein by reference.

TECHNICAL FIELD

The present disclosure relates to the field of communication technology, and in particular, to a method and an apparatus for assigning an identifier, a method and an apparatus for determining a non-access stratum quality of service flow, a base station, user equipment, and a computer-readable storage medium.

BACKGROUND

With the development of communication technology, the $5^{th}$ generation of mobile communication technology (5G) has appeared. A user plane of 5G new radio (NR) introduces a new protocol layer, i.e., a service data adaptation protocol (SDAP) layer, above an existing packet data convergence protocol (PDCP) layer. The SDAP layer is responsible for mapping each quality of service (QoS) flow on an upper layer to each data radio bearer (DRB) on the PDCP layer. The SDAP layer of the NR supports an access stratum (AS) reflective QoS function. That is, when the reflective QoS function of a QoS flow is activated, a DRB to which uplink data with respect to the QoS flow is mapped and a DRB to which downlink data with respect to the QoS flow is mapped remain consistent. If the AS reflective QoS function is activated, an SDAP header of SDAP packet data unit (PDU) needs to carry a bit for AS reflective QoS indicator (RQI) and a QoS flow identifier (ID). The function of the AS RQI is: if user equipment (UE) receives the bit for the AS RQI in the SDAP header for a specific QoS flow being set to 1, it means that the UE needs to update mapping relationship between uplink data of the QoS flow and a DRB. In addition, a Non-Access Stratum (NAS) also supports the reflective QoS function, that is, a QoS flow mapped by uplink data of an internet protocol (IP) flow is consistent with a QoS flow mapped by downlink data of the IP flow. If an NAS reflective QoS function is enabled, the SDAP header needs to carry a bit for NAS RQI and a QoS flow ID.

Whether the SDAP PDU includes the SDAP header may be configured by a base station for UE through a radio resource control (RRC) message. When the SDAP PDU includes the SDAP header, a size of the SDAP header is 1 byte. If the QoS flow is configured with the AS reflective QoS function or NAS reflective QoS function, while downlink SDAP PDU with the SDAP header, the SDAP header is to include a QoS flow ID, a bit for AS RQI, and a bit for NAS RQI. However, whether this QoS flow ID adopts the AS QoS flow ID or the NAS QoS flow ID is inconclusive. The NAS QoS flow ID requires 7 bits. If 7 bits for a QoS flow ID are used, there is only 1 bit left in the header, which may be used only to carry the NAS RQI, and there is no place to carry the AS RQI. If the AS QoS flow ID is introduced, whose size is smaller than that of the NAS QoS flow ID, for example, 6 bits for AS QoS flow ID, the saved bit may be carried the 1 bit AS RQI. Since the size of AS QoS flow ID is smaller than that of the NAS QoS flow ID, it means that a network needs to inform the UE of the mapping relationship therebetween.

The QoS flow ID needs to keep unique in a PDU session. Respective QoS flows in one PDU session may be mapped to different DRBs. QoS flows in different PDU sessions may not be mapped to the same DRB. In a dual connectivity scenario, one part of different QoS flows in a PDU session of the UE may be mapped to a DRB with respect to a master cell group (MCG), and the other part may be mapped to a DRB with respect to a secondary cell group (SCG). In this case, it is still necessary to ensure the uniqueness of the QoS flow ID in the DRBs for the PDU session both in the MCG and SCG.

SUMMARY

In view of this, the present application discloses a method and an apparatus for assigning an identifier, a method and an apparatus for determining an NAS QoS flow, a base station, user equipment, and a computer-readable storage medium, so as to ensure the uniqueness of a QoS flow ID in a DRB for the same PDU session in an MCG and an SCG under a dual connectivity scenario.

According to a first aspect of examples of the present disclosure, there is provided a method of assigning an identifier, where the method is applied to a base station including a master base station or a secondary base station, and the method includes:

assigning an AS QoS flow identifier to a current QoS flow;

determining mapping relationship between an NAS QoS flow identifier and the AS QoS flow identifier;

transmitting the mapping relationship and an SDAP PDU separately or simultaneously to UE, where an SDAP header of the SDAP PDU carries the AS QoS flow identifier assigned to the current QoS flow.

In an example, assigning the AS QoS flow identifier to the current QoS flow includes:

when it is configured for the UE that an SDAP PDU for all QoS flows mapped to a DRB, to which the current QoS flow is mapped, is to include an SDAP header, according to a pre-agreed or pre-negotiated range of AS QoS flow identifiers usable by a cell group base station where the DRB is located, assigning AS QoS flow identifiers to respective ones of all the QoS flows in the DRB or to a QoS flow in the DRB that is to be configured with an AS reflective QoS function or an NAS reflective QoS function.

In an example, assigning the AS QoS flow identifier to the current QoS flow includes:

when it is configured for the UE that an SDAP PDU for all QoS flows mapped to a DRB, to which the current QoS flow is mapped, is to include an SDAP header, transmitting to another base station an AS QoS flow identifier request message for all of the QoS flows in the DRB or for a QoS flow in the DRB that is to be configured with an AS reflective QoS function or an NAS reflective QoS function;

receiving an AS QoS flow identifier returned by the another base station; and assigning the received AS QoS flow identifier to a corresponding QoS flow.

In an example, assigning the AS QoS flow identifier to the current QoS flow further includes:

when it is configured for the UE that the SDAP PDU for all QoS flows mapped to the DRB, to which the current QoS flow is mapped, is to include the SDAP header, assigning any unassigned AS QoS flow identifier, a preset value or a reserved value to a QoS flow that is not configured with the AS reflective QoS function or the NAS reflective QoS function.

In an example, the method further includes:

when transmitting the mapping relationship and the SDAP PDU separately or simultaneously to the UE, transmitting to the UE first indication information indicating that the current QoS flow enables an AS reflective QoS function and/or an NAS reflective QoS function.

In an example, the method further includes:

in response to cell handover, transmitting, to a target cell, the mapping relationship currently transmitted to the UE.

In an example, the method further includes:

in response to cell handover, transmitting, to a target cell, ranges of AS QoS flow identifiers respectively usable by the master base station and the secondary base station.

In an example, the method further includes:

when the current QoS flow is remapped, updating the AS QoS flow identifier for the current QoS flow according to a range of AS QoS flow identifiers usable by a cell group base station where a DRB, to which the current QoS flow is remapped, is located;

determining mapping relationship between an updated NAS QoS flow identifier and the updated AS QoS flow identifier; and transmitting the mapping relationship between the updated NAS QoS flow identifier and the updated AS QoS flow identifier and an SDAP PDU with an SDAP header carrying the updated AS QoS flow identifier, separately or simultaneously, to the UE.

In an example, the method further includes:

transmitting second indication information or third indication information to the UE through a radio resource control (RRC) message, where the second indication information indicates a DRB to which uplink data of the current QoS flow is mapped, and the third indication information indicates that an SDAP PDU for all QoS flows mapped to a DRB, to which the current QoS flow is mapped, is not to include an SDAP header.

According to a second aspect of the examples of the present disclosure, there is provided a method of determining an NAS QoS flow, where the method is applied to UE, and the method includes:

receiving and saving an SDAP PDU and mapping relationship between an NAS QoS flow identifier and an AS QoS flow identifier, which are transmitted separately or simultaneously by a base station, where the base station includes a master base station or a secondary base station, and an SDAP header of the SDAP PDU carries the AS QoS flow identifier assigned to a current QoS flow;

analyzing the SDAP PDU;

in response to reading the AS QoS flow identifier assigned to the current QoS flow from the SDAP header of the SDAP PDU, obtaining a corresponding NAS QoS flow identifier according to the AS QoS flow identifier and the mapping relationship; and determining an NAS QoS flow corresponding to the SDAP PDU according to the obtained NAS QoS flow identifier.

In an example, analyzing the SDAP PDU includes:

in response to determining, by the analyzing, that an AS RQI field of the SDAP header has a first preset value, reading the AS QoS flow identifier assigned to the current QoS flow from the SDAP header.

In an example, analyzing the SDAP PDU includes:

in response to determining, by the analyzing, that an AS RQI field of the SDAP header has a second preset value, and that the current QoS flow is not configured with an NAS reflective QoS function, not reading the AS QoS flow identifier.

In an example, the method further includes:

after determining the NAS QoS flow corresponding to the SDAP PDU according to the obtained NAS QoS flow identifier, indicating an NAS RQI and the corresponding NAS QoS flow identifier to an NAS; and in response to determining, by the analyzing, that an AS RQI field of the SDAP header has a first preset value, updating, by an AS, mapping relationship between uplink data of the current QoS flow and a DRB.

In an example, the method further includes:

after receiving and saving the mapping relationship between the NAS QoS flow identifier and the AS QoS flow identifier which is transmitted by the base station, in response to receiving mapping relationship between an updated NAS QoS flow identifier and an updated AS QoS flow identifier, deleting the mapping relationship between the NAS QoS flow identifier and the AS QoS flow identifier, and saving the mapping relationship between the updated NAS QoS flow identifier and the updated AS QoS flow identifier.

In an example, the method further includes:

when the AS QoS flow identifier assigned to the current QoS flow is not found from the mapping relationship, ignoring the AS QoS flow identifier assigned to the current QoS flow, and delivering data in the SDAP PDU to an upper layer.

In an example, the method further includes:

in response to receiving second indication information indicating a DRB to which uplink data of the current QoS flow is mapped, deleting the AS QoS flow identifier assigned to the current QoS flow when the current QoS flow is not configured with an NAS reflective QoS function; or in response to receiving the second indication information indicating the DRB to which the uplink data of the current QoS flow is mapped, deleting the AS QoS flow identifier assigned to the current QoS flow when the current QoS flow is not configured with an AS reflective QoS function; or in response to receiving third indication information indicating that an SDAP PDU for all QoS flows mapped to a DRB, to which the current QoS flow is mapped, is not to include an SDAP header, deleting the mapping relationship between an NAS QoS flow identifier and an AS QoS flow identifier for each QoS flow mapped to the DRB, to which the current QoS flow is mapped.

According to a third aspect of the examples of the present disclosure, there is provided an apparatus for assigning an identifier, where the apparatus is applied to a base station including a master base station or a secondary base station, and the apparatus includes:

an assigning module configured to assign an AS QoS flow identifier to a current QoS flow;

a first determining module configured to determine mapping relationship between an NAS QoS flow identifier and the AS QoS flow identifier assigned by the assigning module; and a first transmitting module configured to transmit the mapping relationship, determined by the first determining module, and an SDAP PDU separately or simultaneously to UE, where an SDAP header of the SDAP PDU carries the AS QoS flow identifier assigned to the current QoS flow.

In an example, the assigning module includes:

a first assigning sub-module configured to, when it is configured for the UE that an SDAP PDU for all QoS flows mapped to a DRB, to which the current QoS flow is mapped, is to include an SDAP header, assign, according to a pre-agreed or pre-negotiated range of AS QoS flow identifiers usable by a cell group base station where the DRB is located, AS QoS flow identifiers to respective ones of all the QoS flows in the DRB or to a QoS flow in the DRB that is to be configured with an AS reflective QoS function or an NAS reflective QoS function.

In an example, the assigning module includes:

a transmitting sub-module configured to, when it is configured for the UE that an SDAP PDU for all QoS flows mapped to a DRB, to which the current QoS flow is mapped, is to include an SDAP header, transmit to another base station an AS QoS flow identifier request message for all of the QoS flows in the DRB or for a QoS flow in the DRB that is to be configured with an AS reflective QoS function or an NAS reflective QoS function;

a receiving sub-module configured to receive an AS QoS flow identifier that is returned by the another base station in response to the AS QoS flow identifier request message transmitted by the transmitting sub-module; and a second assigning sub-module configured to assign the AS QoS flow identifier received by the receiving sub-module to a corresponding QoS flow.

In an example, the assigning module further includes:

a third assigning sub-module configured to, when it is configured for the UE that the SDAP PDU for all QoS flows mapped to the DRB, to which the current QoS flow is mapped, is to include the SDAP header, assign any unassigned AS QoS flow identifier, a preset value or a reserved value to a QoS flow that is not configured with the AS reflective QoS function or the NAS reflective QoS function.

In an example, the first transmitting module is further configured to, when transmitting the mapping relationship and the SDAP PDU separately or simultaneously to the UE, transmit to the UE first indication information indicating that the current QoS flow enables an AS reflective QoS function and/or an NAS reflective QoS function.

In an example, the apparatus further includes:

a second transmitting module configured to, in response to cell handover, transmit, to a target cell, the mapping relationship currently transmitted to the UE by the first transmitting module.

In an example, the apparatus further includes a third transmitting module configured to, in response to cell handover, transmit, to a target cell, ranges of AS QoS flow identifiers respectively usable by the master base station and the secondary base station, according to which the first assigning sub-module assigns the AS QoS flow identifier.

In an example, the apparatus further includes:

an updating module configured to, when the current QoS flow is remapped, update the AS QoS flow identifier for the current QoS flow according to a range of AS QoS flow identifiers usable by a cell group base station where a DRB, to which the current QoS flow is remapped, is located;

a second determining module configured to determine mapping relationship between an updated NAS QoS flow identifier and the AS QoS flow identifier updated by the updating module; and a fourth transmitting module configured to transmit the mapping relationship between the updated NAS QoS flow identifier and the updated AS QoS flow identifier and an SDAP PDU with an SDAP header carrying the updated AS QoS flow identifier, separately or simultaneously, to the UE.

In an example, the apparatus further includes:

a fifth transmitting module configured to transmit second indication information or third indication information to the UE through an RRC message, where the second indication information indicates a DRB to which uplink data of the current QoS flow is mapped, and the third indication information indicates that an SDAP PDU for all QoS flows mapped to a DRB, to which the current QoS flow is mapped, is not to include an SDAP header.

According to a fourth aspect of the examples of the present disclosure, there is provided an apparatus for determining an NAS QoS flow, where the apparatus is applied to UE, and the apparatus includes:

a receiving and saving module configured to receive and save an SDAP PDU and mapping relationship between an NAS QoS flow identifier and an AS QoS flow identifier, which are transmitted separately or simultaneously by a base station, where the base station includes a master base station or a secondary base station, and an SDAP header of the SDAP PDU carries the AS QoS flow identifier assigned to a current QoS flow;

an analyzing module configured to analyze the SDAP PDU saved by the receiving and saving module;

an obtaining module configured to, in response to reading the AS QoS flow identifier assigned to the current QoS flow from the SDAP header of the SDAP PDU by the analyzing module, obtain a corresponding NAS QoS flow identifier according to the AS QoS flow identifier and the mapping relationship saved by the receiving and saving module; and a determining module configured to determine an NAS QoS flow corresponding to the SDAP PDU according to the NAS QoS flow identifier obtained by the obtaining module.

In an example, the analyzing module includes:

an analyzing and reading sub-module configured to, in response to determining, by the analyzing, that an AS RQI field of the SDAP header has a first preset value, read the AS QoS flow identifier assigned to the current QoS flow from the SDAP header.

In an example, the analyzing module includes:

an analyzing and ignoring sub-module configured to, in response to determining, by the analyzing, that an AS RQI field of the SDAP header has a second preset value, and that the current QoS flow is not configured with an NAS reflective QoS function, not read the AS QoS flow identifier.

In an example, the apparatus further includes:

an indicating module configured to, after the determining module determines the NAS QoS flow corresponding to the SDAP PDU according to the obtained NAS QoS flow identifier, indicate an NAS RQI and the corresponding NAS QoS flow identifier to an NAS; and an updating module configured to, in response to determining that an AS RQI field of the SDAP header has a first preset value, update, by an AS, mapping relationship between uplink data of the current QoS flow and a DRB.

In an example, the apparatus further includes:

a deleting and saving module configured to, after the receiving and saving module receives and saves the mapping relationship between the NAS QoS flow identifier and the AS QoS flow identifier which is transmitted by the base station, in response to receiving mapping relationship between an updated NAS QoS flow identifier and an updated AS QoS flow identifier, delete the mapping relationship between the NAS QoS flow identifier and the AS QoS flow identifier, and save the mapping relationship between the updated NAS QoS flow identifier and the updated AS QoS flow identifier.

In an example, the apparatus further includes:

an ignoring and delivering module configured to, when the AS QoS flow identifier assigned to the current QoS flow is not found from the mapping relationship saved by the receiving and saving module or the deleting and saving module, ignore the AS QoS flow identifier assigned to the current QoS flow, and deliver data in the SDAP PDU to an upper layer.

In an example, the apparatus further includes:

a first deleting module configured to, in response to receiving second indication information indicating a DRB to which uplink data of the current QoS flow is mapped, delete the AS QoS flow identifier assigned to the current QoS flow when the current QoS flow is not configured with an NAS reflective QoS function; or a second deleting module configured to, in response to receiving the second indication information indicating the DRB to which the uplink data of the current QoS flow is mapped, delete the AS QoS flow identifier assigned to the current QoS flow when the current QoS flow is not configured with an AS reflective QoS function; or a third deleting module configured to, in response to receiving third indication information indicating that an SDAP PDU for all QoS flows mapped to a DRB, to which the current QoS flow is mapped, is not to include an SDAP header, delete the mapping relationship between an NAS QoS flow identifier and an AS QoS flow identifier for each QoS flow mapped to the DRB, to which the current QoS flow is mapped.

According to a fifth aspect of the examples of the present disclosure, there is provided a base station, including:

a processor; and a memory for storing instructions executable by the processor, where the processor is configured to:

assign an AS QoS flow identifier to a current QoS flow;

determine mapping relationship between an NAS QoS flow identifier and the AS QoS flow identifier;

transmit the mapping relationship and an SDAP PDU separately or simultaneously to UE, where an SDAP header of the SDAP PDU carries the AS QoS flow identifier assigned to the current QoS flow.

According to a sixth aspect of the examples of the present disclosure, there is provided user equipment, including:

a processor; and a memory for storing instructions executable by the processor, where the processor is configured to:

receive and save an SDAP PDU and mapping relationship between an NAS QoS flow identifier and an AS QoS flow identifier, which are transmitted separately or simultaneously by a base station, where the base station includes a master base station or a secondary base station, and an SDAP header of the SDAP PDU carries the AS QoS flow identifier assigned to a current QoS flow;

analyze the SDAP PDU;

in response to reading the AS QoS flow identifier assigned to the current QoS flow from the SDAP header of the SDAP PDU, obtain a corresponding NAS QoS flow identifier according to the AS QoS flow identifier and the mapping relationship; and determine an NAS QoS flow corresponding to the SDAP PDU according to the obtained NAS QoS flow identifier.

According to a seventh aspect of the examples of the present disclosure, there is provided a computer-readable storage medium storing computer instructions that are executable by a processor to implement a method of assigning an identifier as described above.

According to an eighth aspect of the examples of the present disclosure, there is provided a computer-readable storage medium storing computer instructions that are executable by a processor to implement a method of determining an NAS QoS flow as described above.

The technical solutions provided by the examples of the present disclosure may include the following beneficial effects.

The AS QoS flow identifier is assigned to the current QoS flow and the mapping relationship between the NAS QoS flow identifier and the AS QoS flow identifier is determined, such that the uniqueness of a QoS flow ID in a DRB for the same PDU session under a dual connectivity scenario is ensured. The mapping relationship and the SDAP PDU are separately or simultaneously transmitted to the UE, so that the UE may, based on this, obtain corresponding NAS QoS flow identifier to determine the NAS QoS flow corresponding to the SDAP PDU.

Upon analyzing the received SDAP PDU, if the AS QoS flow identifier assigned to the current QoS flow is read from the SDAP header of the SDAP PDU, according to the AS QoS flow identifier and the received mapping relationship, a corresponding NAS QoS flow identifier is obtained, such that the NAS QoS flow corresponding to the SDAP PDU is determined according to the obtained NAS QoS flow identifier.

It should be understood that the above general description and the following detailed description are only exemplary and explanatory and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
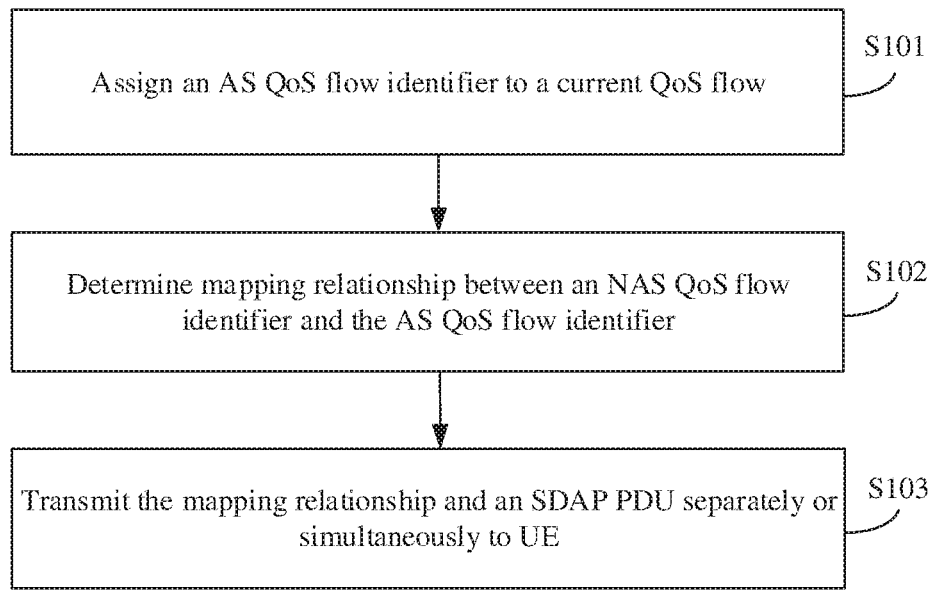
FIG. 1 is a flowchart illustrating a method of assigning an identifier according to an example of the present application.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

FIG. 1 is a flowchart illustrating a method of assigning an identifier according to an example of the present application. This example is described from a base station side and based on a dual connectivity scenario. Therefore, the base station includes a master base station or a secondary base station. As shown in FIG. 1, the method of assigning the identifier includes the followings.

At step S101, an AS QoS flow identifier is assigned to a current QoS flow.

The base station may assign the AS QoS flow identifier to the current QoS flow in many modes, for example, the following pre-allocation modes or real-time negotiation modes. The pre-allocation modes in which the AS QoS flow identifier is assigned to the current QoS flow include mode 1 and mode 2.

Mode 1): when the base station configures, for UE, that an SDAP PDU for all QoS flows mapped to a DRB, to which the current QoS flow is mapped, is to include an SDAP header, according to a pre-agreed or pre-negotiated range of AS QoS flow identifiers usable by a cell group base station where the DRB is located, AS QoS flow identifiers are assigned to respective ones of all the QoS flows in the DRB.

Mode 2): when the base station configures, for UE, that an SDAP PDU for all QoS flows mapped to a DRB, to which the current QoS flow is mapped, is to include an SDAP header, according to a pre-agreed or pre-negotiated range of AS QoS flow identifiers usable by a cell group base station where the DRB is located, an AS QoS flow identifier is assigned to a QoS flow in the mapped DRB that is to be configured with an AS reflective QoS function or an NAS reflective QoS function.

For example, if the base station configures, for UE, that an SDAP PDU for all QoS flows in a DRB needs to include an SDAP header, where the current QoS flow is mapped to the DRB, and the current QoS flow needs to be configured with the AS reflective QoS function or the NAS reflective QoS function, the base station may assign the AS QoS flow identifier to the current QoS flow.

The real-time negotiation modes in which the AS QoS flow identifier is assigned to the current QoS flow include mode 3 and mode 4.

Mode 3): when it is configured for the UE that an SDAP PDU for all QoS flows mapped to a DRB, to which the current QoS flow is mapped, is to include an SDAP header, for all the QoS flows in the mapped DRB, a request message for an AS QoS flow identifier is transmitted to another base station, the AS QoS flow identifier returned by the another base station is received, and the received AS QoS flow identifier is assigned to a corresponding QoS flow.

Mode 4): when it is configured for the UE that an SDAP PDU for all QoS flows mapped to a DRB, to which the current QoS flow is mapped, is to include an SDAP header, for a QoS flow in the DRB that is to be configured with an AS reflective QoS function or an NAS reflective QoS function, a request message for an AS QoS flow identifier is transmitted to another base station, the AS QoS flow identifier returned by the another base station is received, and the received AS QoS flow identifier is assigned to a corresponding QoS flow.

If the above-described four modes are not used to assign the AS QoS flow identifier to the current QoS flow, the following mode may also be used to assign the AS QoS flow identifier to the current QoS flow.

Mode 5): when it is configured for the UE that the SDAP PDU for all QoS flows mapped to the DRB, to which the current QoS flow is mapped, is to include the SDAP header, any unassigned AS QoS flow identifier, a preset value or a reserved value is assigned to a QoS flow that is not configured with the AS reflective QoS function or the NAS reflective QoS function.

The modes of assigning the AS QoS flow identifier to the current QoS flow are flexible and diverse, and may ensure the uniqueness of a QoS flow ID in a DRB for the same PDU session under a dual connectivity scenario.

In this example, the current QoS flow includes a newly arrived QoS flow, that is, when a new QoS flow is mapped to a DRB which has been mapped by a previous QoS flow, the base station also assigns an AS QoS flow ID to the new QoS flow.

At step S102, mapping relationship between an NAS QoS flow identifier and the AS QoS flow identifier is determined.

For example, for each NAS QoS flow ID, the base station may select one AS QoS flow ID from its available AS QoS flow ID pool, randomly or in a preset order such as an ascending order or a descending order, and thereby mapping relationship therebetween may be determined.

The AS QoS flow ID pool includes AS QoS flow identifiers within a range of AS QoS flow identifiers that are usable by a corresponding base station.

It should be noted that the AS QoS flow ID and NAS QoS flow ID remain unique only in one PDU session. QoS flows in one PDU session may be transmitted in a plurality of DRBs. However, QoS flows in different PDU sessions may not be transmitted in the same DRB.

At step S103, the mapping relationship and an SDAP PDU are separately or simultaneously transmitted to UE, where an SDAP header of the SDAP PDU carries the AS QoS flow identifier assigned for the current QoS flow.

The base station may first transmit the mapping relationship to the UE, and then transmit the SDAP PDU to the UE. The mapping relationship and the SDAP PDU may also be transmitted to the UE simultaneously.

Optionally, when transmitting the mapping relationship and the SDAP PDU separately or simultaneously to the UE, first indication information may be transmitted to the UE, where the first indication information indicates that at least one of an AS reflective QoS function and an NAS reflective QoS function is enabled in the current QoS flow. After receiving the first indication information, the UE may determine, according to the first indication information, whether the current QoS flow enables at least one of the AS reflective QoS function and the NAS reflective QoS function.

In the example, the AS QoS flow identifier is assigned to the current QoS flow, and the mapping relationship between the NAS QoS flow identifier and the AS QoS flow identifier is determined, thus, the uniqueness of a QoS flow ID in a DRB for the same PDU session under a dual connectivity scenario is ensured. The mapping relationship and the SDAP PDU are separately or simultaneously transmitted to the UE, so that the UE may, based on this, obtain corresponding NAS QoS flow identifier to determine the NAS QoS flow corresponding to the SDAP PDU.

Figure 2:
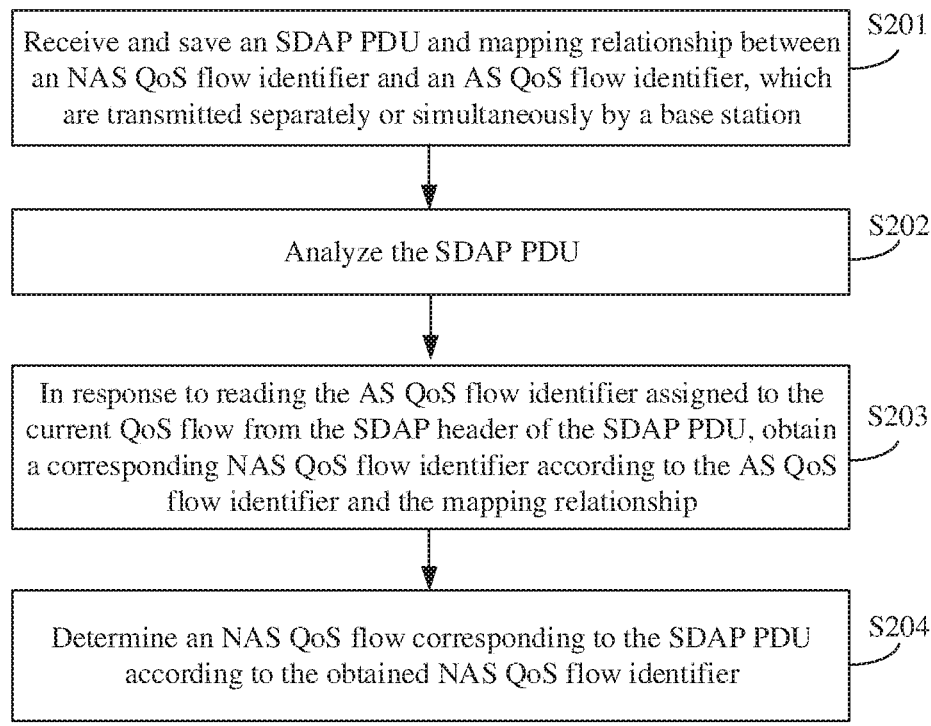
FIG. 2 is a flowchart illustrating a method of determining an NAS QoS flow according to an example of the present application.

FIG. 2 is a flowchart illustrating a method of determining an NAS QoS flow according to an example of the present application. This example is described from a UE side. As shown in FIG. 2, the method of determining the NAS QoS flow includes the followings.

At step S201, an SDAP PDU and mapping relationship between an NAS QoS flow identifier and an AS QoS flow identifier are received and saved, where the SDAP PDU and the mapping relationship are transmitted separately or simultaneously by a base station, the base station includes a master base station or a secondary base station, and an SDAP header of the SDAP PDU carries an AS QoS flow identifier assigned to a current QoS flow.

At step S202, the SDAP PDU is analyzed.

The UE analyzes the received SDAP PDU. If it is determined, by the analyzing, that an AS reflective QoS indicator (RQI) field in the SDAP header has a first preset value, for example, 1, the AS QoS flow identifier assigned to the current QoS flow may be read from the SDAP header. If it is determined, by the analyzing, that an AS RQI field in the SDAP header has a second preset value, for example, 0, and the current QoS flow is not configured with an NAS reflective QoS function, the AS QoS flow identifier is not read.

At step S203, in response to reading the AS QoS flow identifier assigned to the current QoS flow from the SDAP header of the SDAP PDU, according to the AS QoS flow identifier and the mapping relationship, a corresponding NAS QoS flow identifier is obtained.

At step S204, an NAS QoS flow corresponding to the SDAP PDU is determined according to the obtained NAS QoS flow identifier.

In the above example, upon analyzing the received SDAP PDU, if the AS QoS flow identifier assigned to the current QoS flow is read from the SDAP header of the SDAP PDU, according to the AS QoS flow identifier and the received mapping relationship, a corresponding NAS QoS flow identifier is obtained, so that the NAS QoS flow corresponding to the SDAP PDU is determined according to the obtained NAS QoS flow identifier.

Figure 3:
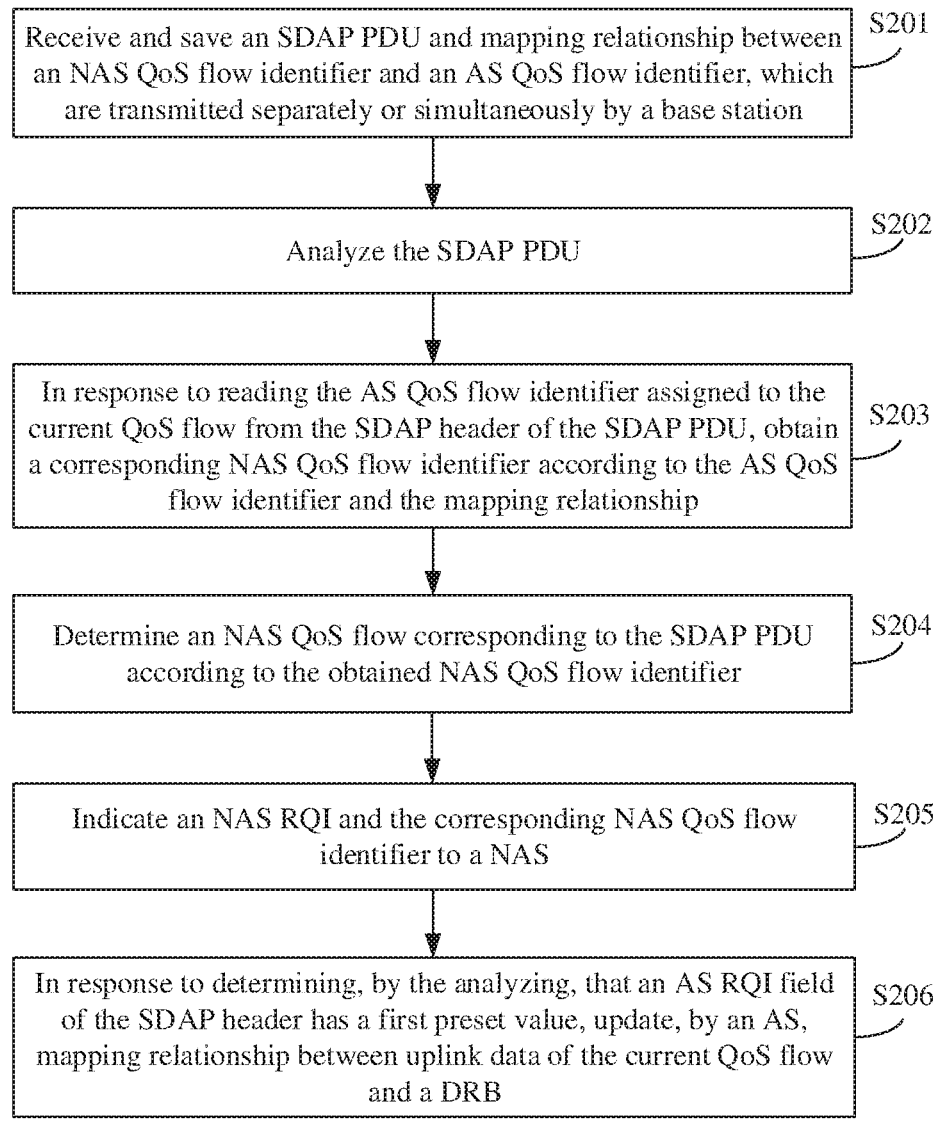
FIG. 3 is a flowchart illustrating another method of determining an NAS QoS flow according to an example of the present application.

FIG. 3 is a flowchart illustrating another method of determining an NAS QoS flow according to an example of the present application. As shown in FIG. 3, after the step S204, the method of determining the NAS QoS flow may further include the followings.

At step S205, an NAS RQI and the corresponding NAS QoS flow identifier are indicated to an NAS.

At step S206, in response to determining, by the analyzing, that an AS RQI field of the SDAP header has a first preset value, mapping relationship between uplink data of the current QoS flow and a DRB is updated by an AS.

After determining the NAS QoS flow corresponding to the SDAP PDU, the UE may indicate, to the NAS, the NAS RQI and the corresponding NAS QoS flow ID. If the UE analyzes that the AS RQI field in the SDAP header has the first preset value, for example, 1, the mapping relationship between the uplink data of the current QoS flow and the DRB may be updated by the AS.

It should be noted that in the example, in addition to the uplink data of the current QoS flow explicitly indicated, current QoS flows elsewhere refer to downlink data of the current QoS flow.

In the above example, by indicating, to the NAS, the NAS RQI and the corresponding NAS QoS flow identifier, the NAS may perform corresponding operations based on this. And when it is determined, by analyzing, that the AS RQI field in the SDAP header has the first preset value, the mapping relationship between the uplink data of the current QoS flow and the DRB is updated by the AS. Thus, a correct NAS QoS flow identifier may be obtained based on this, and thereby the NAS QoS flow corresponding to the SDAP PDU may be correctly determined.

Figure 4:
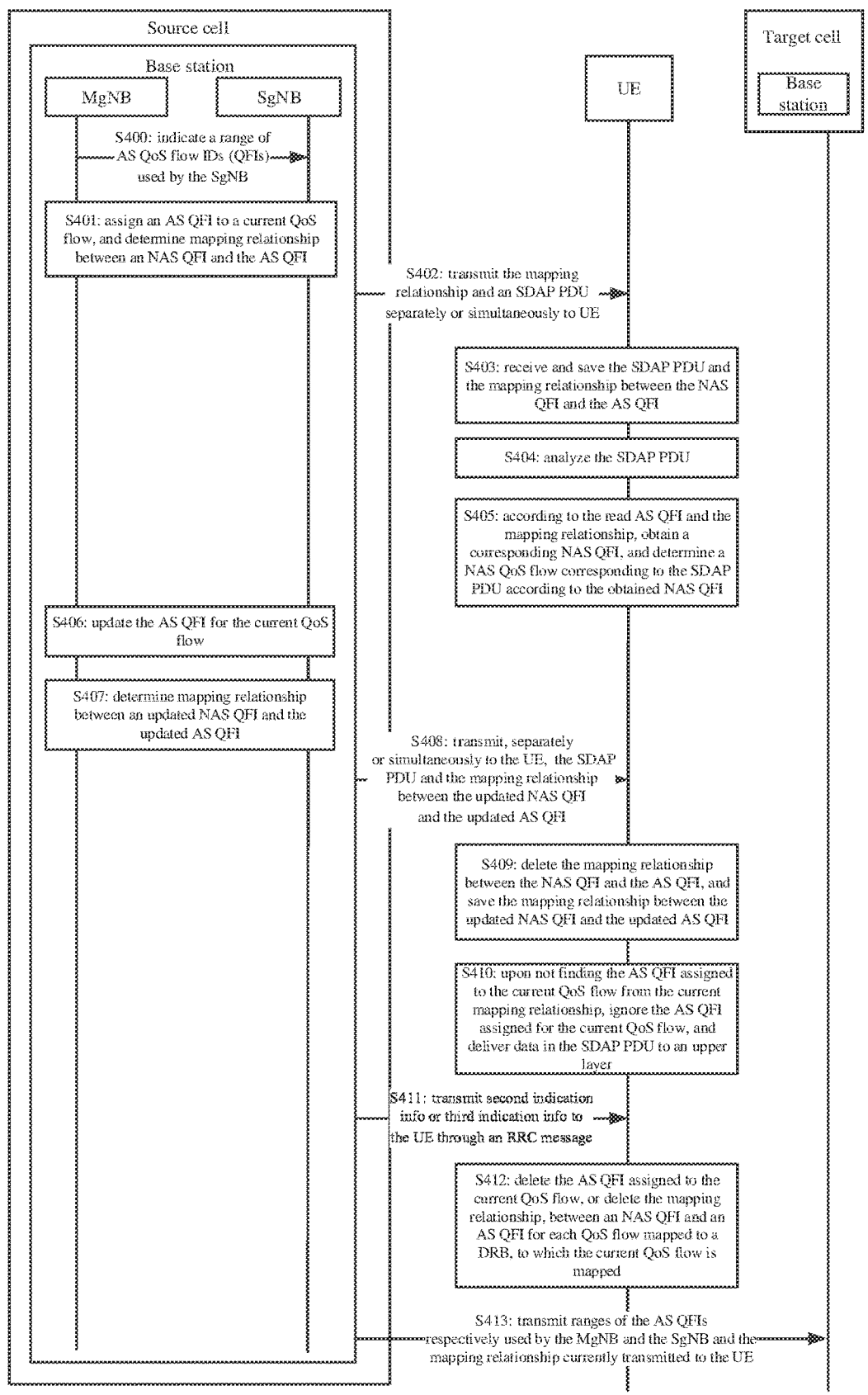
FIG. 4 is a signaling flowchart illustrating a method of determining an NAS QoS flow according to an example of the present application.

FIG. 4 is a signaling flowchart illustrating a method of determining an NAS QoS flow according to an example of the present application. This example is described from the angle of interaction between a base station and UE. The base station includes a master base station and a secondary base station. As shown in FIG. 4, the method of determining the NAS QoS flow includes the followings.

At step S400, a master gNB (MgNB) indicates a range of AS QoS flow IDs usable by a secondary gNB (SgNB).

In the example, an MCG and an SCG may pre-agree or pre-negotiate ranges of AS QoS flow IDs that each will use. For modes pre-negotiated by the MCG and the SCG, the MgNB may indicate to the SgNB the range of AS QoS flow IDs available therefor (per UE indication or per PDU session indication). For example, a minimum or maximum value of the AS QoS flow IDs is indicated to the SgNB, such that all QoS flow IDs greater than the minimum QoS flow ID value or less than the maximum QoS flow ID value may be usable by the SgNB. This indication may be provided by the MgNB to the SgNB via a request message when the SgNB is added or changed. The MgNB may indicate to the SgNB a new range of the AS QoS flow IDs at any time. The SgNB may also request to the MgNB at any time to increase or decrease the range of the AS QoS flow IDs. After receiving the request, the MgNB may provide a new range according to the request.

At step S401, a base station assigns an AS QoS flow identifier to a current QoS flow, and determines mapping relationship between an NAS QoS flow identifier and the AS QoS flow identifier.

The base station may use the mode 1) or mode 2) in the example shown in FIG. 1 to assign the AS QoS flow identifier to the current QoS flow.

When assigning the AS QoS flow ID, if a DRB, to which the current QoS flow is mapped, is located in the MCG, the MgNB selects an AS QoS flow ID from its AS QoS flow ID pool and assigns the AS QoS flow ID to the current QoS flow, and at the same time, it may also further indicate to enable at least one of an NAS reflective QoS function and an AS reflective QoS function.

When assigning the AS QoS flow ID, if a DRB, to which the current QoS flow is mapped, is located in the SCG, the SgNB selects an AS QoS flow ID from its AS QoS flow ID pool and assigns the AS QoS flow ID to the current QoS flow, and at the same time, it may also further indicate to enable at least one of an NAS reflective QoS function and an AS reflective QoS function.

At step S402, the base station transmits the mapping relationship and an SDAP PDU separately or simultaneously to the UE, where an SDAP header of the SDAP PDU carries the AS QoS flow identifier assigned for the current QoS flow.

At step S403, the UE receives and saves the SDAP PDU and the mapping relationship between the NAS QoS flow identifier and the AS QoS flow identifier, which are transmitted separately or simultaneously by the base station.

At step S404, the SDAP PDU is analyzed.

At step S405, in response to reading the AS QoS flow identifier assigned to the current QoS flow from the SDAP header of the SDAP PDU, according to the AS QoS flow identifier and the mapping relationship, a corresponding NAS QoS flow identifier is obtained; and an NAS QoS flow corresponding to the SDAP PDU is determined according to the obtained NAS QoS flow identifier.

At step S406, if the current QoS flow is remapped, a cell group base station, where a DRB remapped by the current QoS flow is located, updates the AS QoS flow identifier for the current QoS flow according to a range of AS QoS flow identifiers usable by the cell group base station.

At step S407, the cell group base station where the remapped DRB is located determines mapping relationship between an updated NAS QoS flow identifier and the updated AS QoS flow identifier.

At step S408, the cell group base station where the remapped DRB is located transmits, separately or simultaneously to the UE, an SDAP PDU and the mapping relationship between the updated NAS QoS flow identifier and the updated AS QoS flow identifier, where an SDAP header of the SDAP PDU carries the updated AS QoS flow identifier.

If the current QoS flow is remapped, for example, from a DRB with respect to the MCG to a DRB with respect to the SCG, a remapped SgNB in the SCG needs to assign an AS QoS flow ID to the current QoS flow from an AS QoS flow ID pool of the SCG, and the mapping relationship between the updated NAS QoS flow ID and the updated AS QoS flow ID is configured to the UE by the MgNB.

If the current QoS flow is remapped, for example, from a DRB with respect to the SCG to a DRB with respect to the MCG, a remapped MgNB in the MCG needs to assign an AS QoS flow ID to the current QoS flow from an AS QoS flow ID pool of the MCG, and the mapping relationship between the updated NAS QoS flow ID and the updated AS QoS flow ID is configured to the UE by the SgNB.

At step S409, if receiving the mapping relationship between the updated NAS QoS flow identifier and the updated AS QoS flow identifier, the UE deletes the mapping relationship between the NAS QoS flow identifier and the AS QoS flow identifier, and saves the mapping relationship between the updated NAS QoS flow identifier and the updated AS QoS flow identifier.

Steps S406-S409 are optional steps.

At step S410, if the UE does not find the AS QoS flow identifier assigned to the current QoS flow from the current mapping relationship, the AS QoS flow identifier assigned to the current QoS flow is ignored, and data in the SDAP PDU is delivered to an upper layer.

Due to the update of the mapping relationship, the UE may receive an SDAP packet including a previous AS QoS flow ID. This is because some SDAP packets may have been generated before a new configuration message arrives, but the SDAP packets may arrive at the UE after the new configuration message taking effect. Or, in the case of remapping, SDAP PDU packets generated in the MCG will be forwarded to the SCG for transmission, or SDAP PDU packets generated in the SCG will be forwarded to the MCG for transmission. At this time, the UE receives both new and old AS QoS flow IDs. Moreover, the UE may not determine the AS QoS flow identifier assigned to current QoS flow from current mapping relationship, so that the UE may ignore the AS QoS flow ID, and deliver the data in the SDAP PDU to the upper layer.

Step S410 is an optional step.

At step S411, the base station transmits second indication information or third indication information to the UE through a radio resource control (RRC) message, where the second indication information indicates a DRB to which uplink data of the current QoS flow is mapped, and the third indication information indicates that an SDAP PDU for all QoS flows mapped to a DRB, to which the current QoS flow is mapped, is not to include an SDAP header.

At step S412, if the UE receives the second indication information, when the current QoS flow is not configured with the NAS reflective QoS function, the UE deletes the AS QoS flow identifier assigned to the current QoS flow; or if the UE receives the second indication information, when the current QoS flow is not configured with the AS reflective QoS function, the UE deletes the AS QoS flow identifier assigned to the current QoS flow; or if the UE receives the third indication information, the UE deletes the mapping relationship, between an NAS QoS flow identifier and an AS QoS flow identifier for each QoS flow in the DRB, to which the current QoS flow is mapped.

Steps S411-S412 are optional steps.

At step S413, in response to cell handover, a base station in a source cell transmits to a target cell ranges of AS QoS flow identifiers respectively usable by the master base station and the secondary base station and the mapping relationship currently transmitted to the UE.

When the cell handover occurs, the base station in the source cell, that is, the base station before the cell handover occurs, notifies the target cell about respective ranges of AS QoS flow IDs of the MgNB and SgNB. At the same time, the target cell is to be notified about the current mapping relationship between the NAS QoS flow ID and the AS QoS flow ID of the UE.

In addition, if the current QoS flow is remapped during the handover, the base station needs to provide the mapping relationship between the updated NAS QoS flow ID and the updated AS QoS flow ID to the UE.

Step S413 is an optional step.

In the example, according to the interaction between the base station and the UE, the base station assigns the AS QoS flow ID to the current QoS flow, determines and updates the mapping relationship between the NAS QoS flow ID and the AS QoS flow ID when the remapping or cell handover, then transmits, to the UE, the newest mapping relationship and the SDAP PDU. After receiving the mapping relationship and the SDAP PDU, the UE may, based on this, determine the NAS QoS flow corresponding to the SDAP PDU. When not finding the AS QoS flow identifier assigned to the current QoS flow from the current mapping relationship, the UE ignores the AS QoS flow identifier assigned to the current QoS flow, and delivers the data in the SDAP PDU to the upper layer. Moreover, when the UE receives the second indication information and the current QoS flow is not configured with the NAS or AS reflective QoS function, the UE deletes the AS QoS flow identifier assigned to the current QoS flow. When receiving the third indication information, the UE deletes the mapping relationship, between the NAS QoS flow identifier and the AS QoS flow identifier for each QoS flow in the DRB, to which the current QoS flow is mapped.

Figure 5:
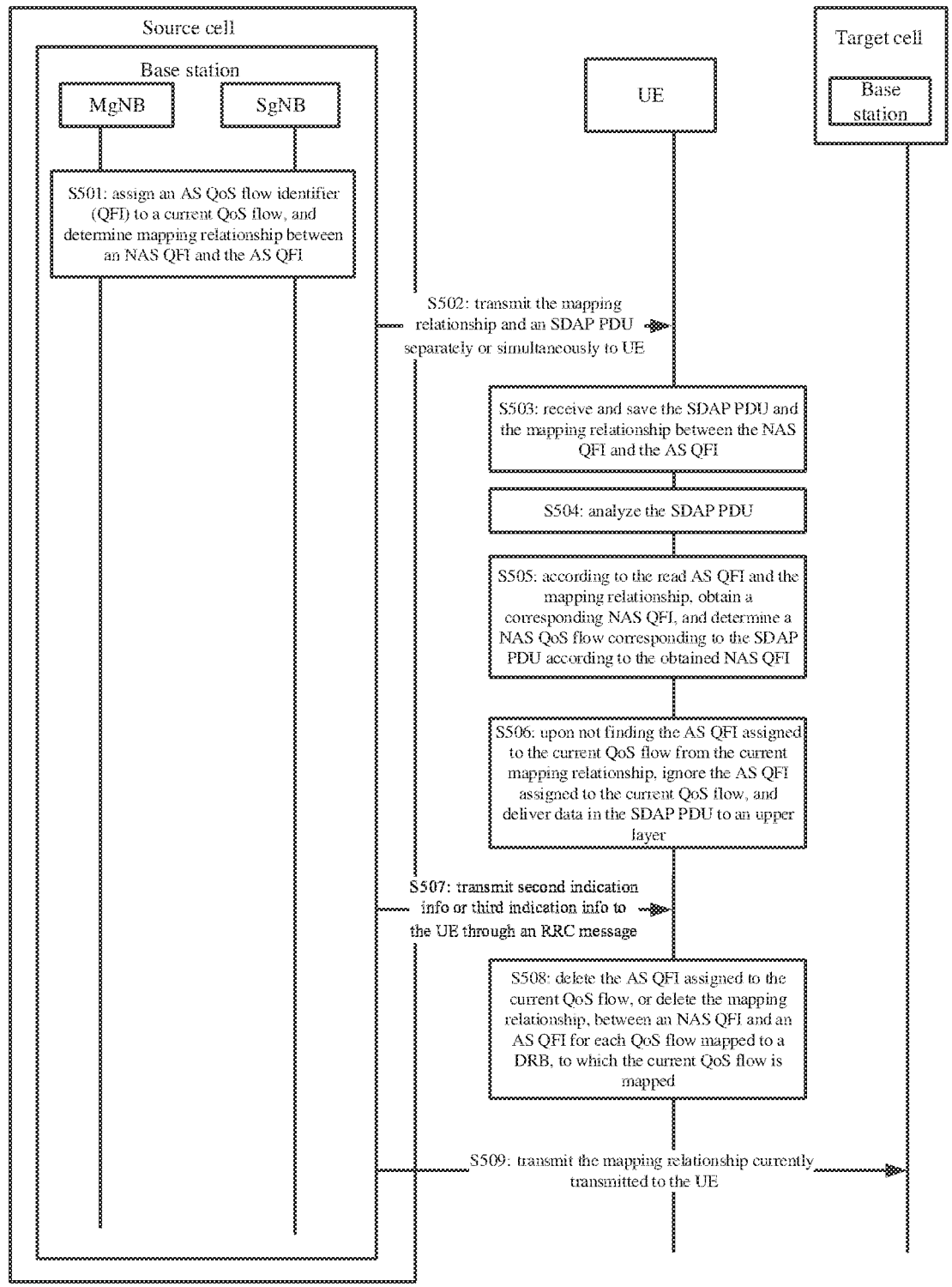
FIG. 5 is a signaling flowchart illustrating another method of determining an NAS QoS flow according to an example of the present application.

FIG. 5 is a signaling flowchart illustrating another method of determining an NAS QoS flow according to an example of the present application. This example is described from the angle of interaction between a base station and UE. The base station includes a master base station and a secondary base station. As shown in FIG. 5, the method of determining the NAS QoS flow includes the followings.

At step S501, a base station assigns an AS QoS flow identifier to a current QoS flow, and determines mapping relationship between an NAS QoS flow identifier and the AS QoS flow identifier.

The base station may use the mode 3) or mode 4) in the example shown in FIG. 1 to assign the AS QoS flow identifier for the current QoS flow.

When assigning the AS QoS flow ID, if a DRB, to which the current QoS flow is mapped, is located in the MCG, the MgNB selects an AS QoS flow ID from its AS QoS flow ID pool and assigns the AS QoS flow ID to the current QoS flow, and at the same time, it may also further indicate to enable at least one of an NAS reflective QoS function and an AS reflective QoS function.

When assigning the AS QoS flow ID, if a DRB, to which the current QoS flow is mapped, is located in the SCG, the SgNB selects an AS QoS flow ID from its AS QoS flow ID pool and assigns the AS QoS flow ID to the current QoS flow, and at the same time, it may also further indicate to enable at least one of an NAS reflective QoS function and an AS reflective QoS function.

At step S502, the base station transmits the mapping relationship and an SDAP PDU separately or simultaneously to the UE, where an SDAP header of the SDAP PDU carries the AS QoS flow identifier assigned for the current QoS flow.

At step S503, the UE receives and saves the SDAP PDU and the mapping relationship between the NAS QoS flow identifier and the AS QoS flow identifier, which are transmitted separately or simultaneously by the base station.

At step S504, the SDAP PDU is analyzed.

At step S505, in response to reading the AS QoS flow identifier assigned to the current QoS flow from the SDAP header of the SDAP PDU, according to the AS QoS flow identifier and the mapping relationship, a corresponding NAS QoS flow identifier is obtained; and an NAS QoS flow corresponding to the SDAP PDU is determined according to the obtained NAS QoS flow identifier.

At step S506, if the UE does not find the AS QoS flow identifier assigned to the current QoS flow from the current mapping relationship, the AS QoS flow identifier assigned to the current QoS flow is ignored, and data in the SDAP PDU is delivered to an upper layer.

Due to the update of the mapping relationship, the UE may receive an SDAP packet including a previous AS QoS flow ID. This is because some SDAP packets may have been generated before a new configuration message arrives, but the SDAP packets may arrive at the UE after the new configuration message taking effect. Or, in the case of remapping, SDAP PDU packets generated in the MCG will be forwarded to the SCG for transmission, or SDAP PDU packets generated in the SCG will be forwarded to the MCG for transmission. At this time, the UE receives both new and old AS QoS flow IDs. Moreover, the UE may not determine the AS QoS flow identifier assigned to current QoS flow from current mapping relationship, so that the UE may ignore the AS QoS flow ID, and send the data in the SDAP PDU to the upper layer.

Step S506 is an optional step.

At step S507, the base station transmits second indication information or third indication information to the UE through an RRC message, where the second indication information indicates a DRB to which uplink data of the current QoS flow is mapped, and the third indication information indicates that an SDAP PDU for all QoS flows mapped to a DRB, to which the current QoS flow is mapped, is not to include an SDAP header.

At step S508, if the UE receives the second indication information, when the current QoS flow is not configured with the NAS reflective QoS function, the UE deletes the AS QoS flow identifier assigned to the current QoS flow; or if the UE receives the second indication information, when the current QoS flow is not configured with the AS reflective QoS function, the UE deletes the AS QoS flow identifier assigned to the current QoS flow; or if the UE receives the third indication information, the UE deletes the mapping relationship between an NAS QoS flow identifier and an AS QoS flow identifier for each QoS flow mapped to the DRB, to which the current QoS flow is mapped.

Steps S507 to S508 are optional steps.

At step S509, in response to cell handover, a base station in a source cell transmits to a target cell the mapping relationship currently transmitted to the UE.

When the cell handover occurs, the base station in the source cell, that is, the base station before the cell handover occurs, notifies the target cell about the current mapping relationship between the NAS QoS flow ID and the AS QoS flow ID of the UE.

Step S509 is an optional step.

In the example, according to the interaction between the base station and the UE, the base station assigns the AS QoS flow ID to the current QoS flow, determines and updates the mapping relationship between the NAS QoS flow ID and the AS QoS flow ID when the cell handover occurs, then transmits, to the UE, the newest mapping relationship and the SDAP PDU. After receiving the mapping relationship and the SDAP PDU, the UE may, based on this, determine the NAS QoS flow corresponding to the SDAP PDU. When not finding the AS QoS flow identifier assigned to the current QoS flow from the current mapping relationship, the UE ignores the AS QoS flow identifier assigned for the current QoS flow, and delivers the data in the SDAP PDU to the upper layer. Moreover, when the UE receives the second indication information and the current QoS flow is not configured with the NAS or AS reflective QoS function, the UE deletes the AS QoS flow identifier assigned to the current QoS flow. When receiving the third indication information, the UE deletes the mapping relationship, between the NAS QoS flow identifier and the AS QoS flow identifier for each QoS flow in the DRB, to which the current QoS flow is mapped.

Figure 6:
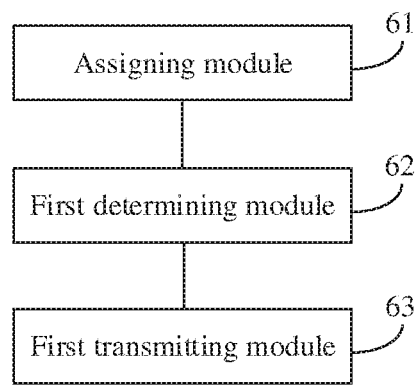
FIG. 6 is a block diagram illustrating an apparatus for assigning an identifier according to an example of the present application.

FIG. 6 is a block diagram illustrating an apparatus for assigning an identifier according to an example of the present application. The apparatus may be located in a base station. The base station includes a master base station or a secondary base station. As shown in FIG. 6, the apparatus includes: an assigning module 61, a first determining module 62 and a first transmitting module 63.

The assigning module 61 is configured to assign an AS QoS flow identifier to a current QoS flow.

The base station may assign the AS QoS flow identifier to the current QoS flow in many modes, for example, the following pre-allocation modes or real-time negotiation modes.

The first determining module 62 is configured to determine mapping relationship between an NAS QoS flow identifier and the AS QoS flow identifier assigned by the assigning module 61.

For example, for each NAS QoS flow ID, the base station may select one AS QoS flow ID from its available AS QoS flow ID pool, randomly or in a preset order such as an ascending order or a descending order, and thereby mapping relationship therebetween may be determined.

The AS QoS flow ID pool includes AS QoS flow identifiers within a range of AS QoS flow identifiers that are usable by a corresponding base station.

It should be noted that the AS QoS flow ID and NAS QoS flow ID remain unique only in one PDU session. QoS flows in one PDU session may be transmitted in a plurality of DRBs. However, QoS flows in different PDU sessions may not be transmitted in the same DRB.

The first transmitting module 63 is configured to transmit the mapping relationship, determined by the first determining module 62, and an SDAP PDU separately or simultaneously to UE, where an SDAP header of the SDAP PDU carries the AS QoS flow identifier assigned to the current QoS flow.

The base station may first transmit the mapping relationship to the UE, and then transmit the SDAP PDU to the UE. The mapping relationship and the SDAP PDU may also be transmitted to the UE simultaneously.

The first transmitting module 63 may be further configured to, when transmitting the mapping relationship and the SDAP PDU separately or simultaneously to the UE, transmit to the UE first indication information indicating that the current QoS flow enables an AS reflective QoS function and/or an NAS reflective QoS function.

Optionally, the first transmitting module 63, when transmitting the mapping relationship and the SDAP PDU separately or simultaneously to the UE, may also transmit to the UE the first indication information indicates that at least one of an AS reflective QoS function and an NAS reflective QoS function is enabled in the current QoS flow. After receiving the first indication information, the UE may determine, according to the first indication information, whether the current QoS flow enables at least one of the AS reflective QoS function and the NAS reflective QoS function.

In the example, the AS QoS flow identifier is assigned to the current QoS flow, and the mapping relationship between the NAS QoS flow identifier and the AS QoS flow identifier is determined, thus, the uniqueness of a QoS flow ID in a DRB for the same PDU session under a dual connectivity scenario is ensured. The mapping relationship and the SDAP PDU are separately or simultaneously transmitted to the UE, so that the UE may, based on this, obtain corresponding NAS QoS flow identifier to determine the NAS QoS flow corresponding to the SDAP PDU.

Figure 7A:
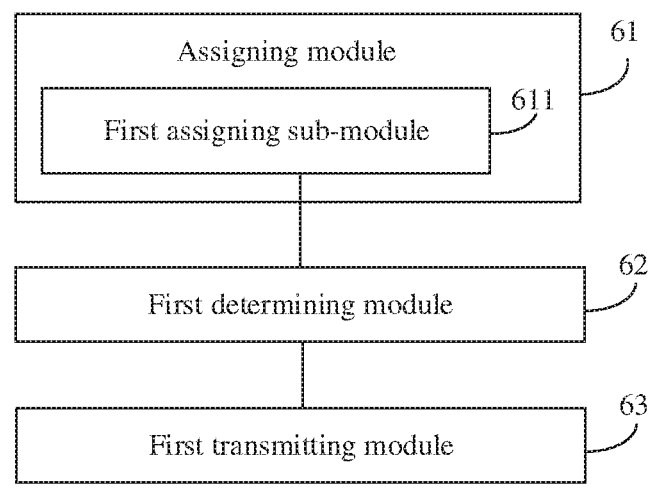
FIG. 7A is a block diagram illustrating another apparatus for assigning an identifier according to an example of the present application.

FIG. 7A is a block diagram illustrating another apparatus for assigning an identifier according to an example of the present application. As shown in FIG. 7A, on the basis of the example shown in FIG. 6, the assigning module 61 may include a first assigning sub-module 611.

The first assigning sub-module 611 is configured to, when it is configured for the UE that an SDAP PDU for all QoS flows mapped to a DRB, to which the current QoS flow is mapped, is to include an SDAP header, assign, according to a pre-agreed or pre-negotiated range of AS QoS flow identifiers usable by a cell group base station where the DRB is located, AS QoS flow identifiers to respective ones of all the QoS flows in the DRB or to a QoS flow in the DRB that is to be configured with an AS reflective QoS function or an NAS reflective QoS function.

The pre-allocation modes in which the AS QoS flow identifier is assigned to the current QoS flow include mode 1 and mode 2.

Mode 1): when the base station configures, for UE, that an SDAP PDU for all QoS flows mapped to a DRB, to which the current QoS flow is mapped, is to include an SDAP header, according to a pre-agreed or pre-negotiated range of AS QoS flow identifiers usable by a cell group base station where the DRB is located, AS QoS flow identifiers are assigned to respective ones of all the QoS flows in the DRB.

Mode 2): when the base station configures, for UE, that an SDAP PDU for all QoS flows mapped to a DRB, to which the current QoS flow is mapped, is to include an SDAP header, according to a pre-agreed or pre-negotiated range of AS QoS flow identifiers usable by a cell group base station where the DRB is located, an AS QoS flow identifier is assigned to a QoS flow in the mapped DRB that is to be configured with an AS reflective QoS function or an NAS reflective QoS function.

For example, if the base station configures, for UE, that an SDAP PDU for all QoS flows in a DRB needs to include an SDAP header, where the current QoS flow is mapped to the DRB, and the current QoS flow needs to be configured with the AS reflective QoS function or the NAS reflective QoS function, the base station may assign the AS QoS flow identifier to the current QoS flow.

In the example, the modes of assigning the AS QoS flow identifier to the current QoS flow are flexible and diverse, and may ensure the uniqueness of a QoS flow ID in a DRB for the same PDU session under a dual connectivity scenario.

Figure 7B:
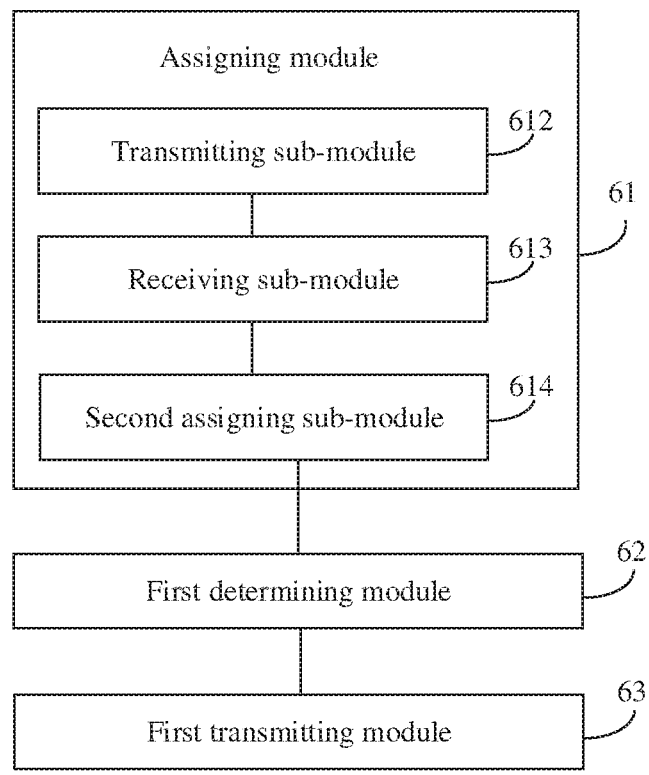
FIG. 7B is a block diagram illustrating another apparatus for assigning an identifier according to an example of the present application.

FIG. 7B is a block diagram illustrating another apparatus for assigning an identifier according to an example of the present application. As shown in FIG. 7B, on the basis of the example shown in FIG. 6, the assigning module 61 may include a transmitting sub-module 612, a receiving sub-module 613 and a second assigning sub-module 614.

The transmitting sub-module 612 is configured to, when it is configured for the UE that an SDAP PDU for all QoS flows mapped to a DRB, to which the current QoS flow is mapped, is to include an SDAP header, transmit to another base station an AS QoS flow identifier request message for each QoS flow in the DRB or for a QoS flow in the DRB that is to be configured with an AS reflective QoS function or an NAS reflective QoS function.

The receiving sub-module 613 is configured to receive an AS QoS flow identifier that is returned by the another base station in response to the AS QoS flow identifier request message transmitted by the transmitting sub-module 612.

The second assigning sub-module 614 is configured to assign the AS QoS flow identifier received by the receiving sub-module to a corresponding QoS flow.

The real-time negotiation modes in which the AS QoS flow identifier is assigned to the current QoS flow include mode 3 and mode 4.

Mode 3): when it is configured for the UE that an SDAP PDU for all QoS flows mapped to a DRB, to which the current QoS flow is mapped, is to include an SDAP header, for all the QoS flows in the mapped DRB, a request message for an AS QoS flow identifier is transmitted to another base station, the AS QoS flow identifier returned by the another base station is received, and the received AS QoS flow identifier is assigned to a corresponding QoS flow.

Mode 4): when it is configured for the UE that an SDAP PDU for all QoS flows mapped to a DRB, to which the current QoS flow is mapped, is to include an SDAP header, for a QoS flow in the DRB that is to be configured with an AS reflective QoS function or an NAS reflective QoS function, a request message for an AS QoS flow identifier is transmitted to another base station, the AS QoS flow identifier returned by the another base station is received, and the received AS QoS flow identifier is assigned to a corresponding QoS flow.

In the above example, the modes of assigning the AS QoS flow identifier for the current QoS flow are flexible and diverse, and may ensure the uniqueness of a QoS flow ID in a DRB for the same PDU session under a dual connectivity scenario.

Figure 7C:
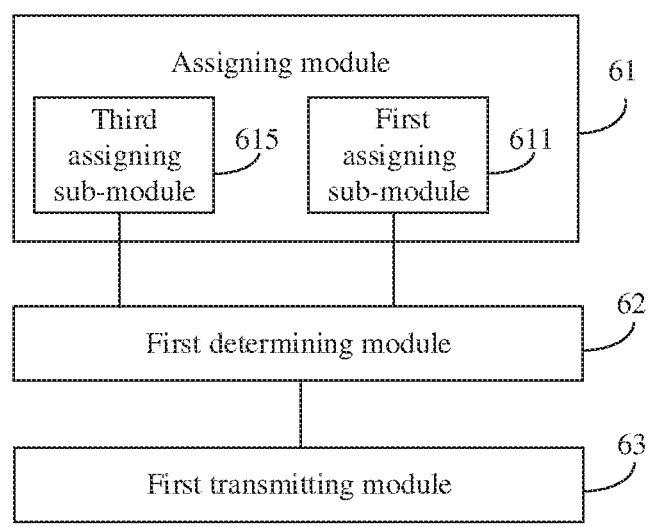
FIG. 7C is a block diagram illustrating another apparatus for assigning an identifier according to an example of the present application.

FIG. 7C is a block diagram illustrating another apparatus for assigning an identifier according to an example of the present application. As shown in FIG. 7C, on the basis of the example shown in FIG. 7A, the assigning module 61 may further include a third assigning sub-module 615.

The third assigning sub-module 615 is configured to, when it is configured for the UE that the SDAP PDU for all QoS flows mapped to the DRB, to which the current QoS flow is mapped, is to include the SDAP header, assign any unassigned AS QoS flow identifier, a preset value or a reserved value to a QoS flow that is not configured with the AS reflective QoS function or the NAS reflective QoS function.

Figure 7D:
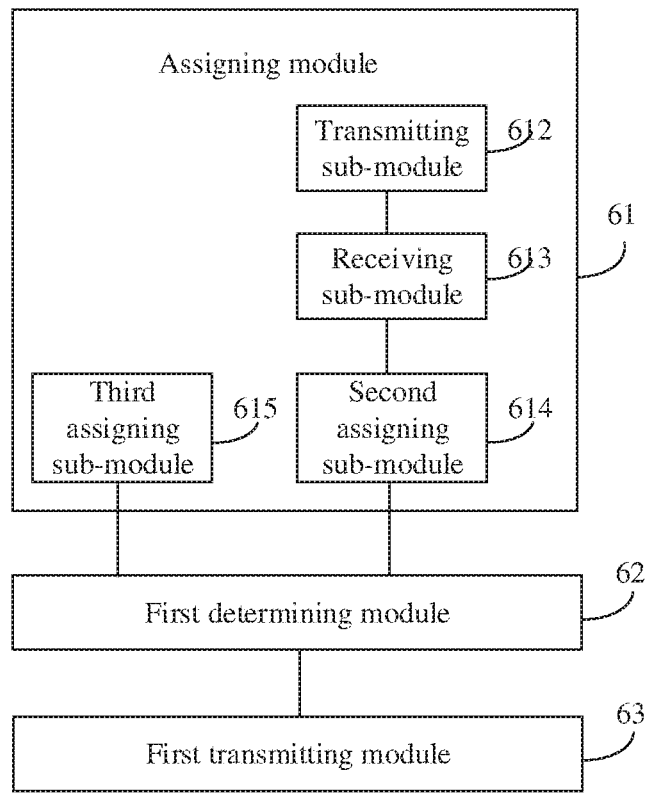
FIG. 7D is a block diagram illustrating another apparatus for assigning an identifier according to an example of the present application.

In addition, on the basis of the example shown in FIG. 7B, the assigning module 61 may further include a third assigning sub-module 615, as shown in FIG. 7D.

If the above-described four modes are not used to assign the AS QoS flow identifier to the current QoS flow, the following mode may also be used to assign the AS QoS flow identifier to the current QoS flow.

Mode 5): when it is configured for the UE that the SDAP PDU for all QoS flows mapped to the DRB, to which the current QoS flow is mapped, is to include the SDAP header, any unassigned AS QoS flow identifier, a preset value or a reserved value is assigned to a QoS flow that is not configured with the AS reflective QoS function or the NAS reflective QoS function.

In the example, in a case that the previous allocation modes do not assign the AS QoS flow identifier to the current QoS flow, there is further provided the mode for assigning the AS QoS flow identifier to the current QoS flow, and the uniqueness of a QoS flow ID in a DRB for the same PDU session under a dual connectivity scenario may be ensured.

Figure 8A:
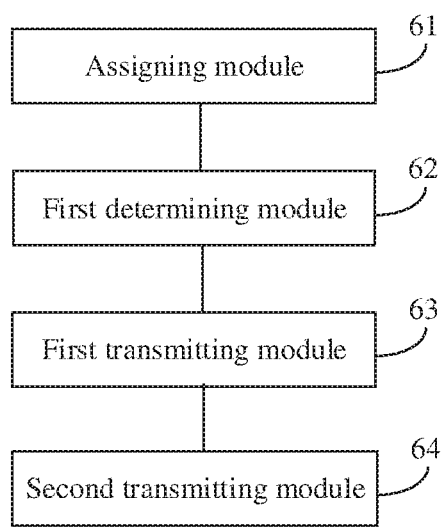
FIG. 8A is a block diagram illustrating another apparatus for assigning an identifier according to an example of the present application.

FIG. 8A is a block diagram illustrating another apparatus for assigning an identifier according to an example of the present application. As shown in FIG. 8A, on the basis of the example shown in FIG. 6, the apparatus may further include a second transmitting module 64.

The second transmitting module 64 is configured to, in response to cell handover, transmit, to a target cell, the mapping relationship currently transmitted to the UE by the first transmitting module 63.

When the cell handover occurs, the base station in the source cell, that is, the base station before the cell handover occurs, notifies the target cell about the current mapping relationship between the NAS QoS flow ID and the AS QoS flow ID of the UE.

In the above example, when the cell handover occurs, the mapping relationship is transmitted to the target cell, such that a target cell base station may obtain the mapping relationship, and may transmit correct mapping relationship to corresponding UE.

Figure 8B:
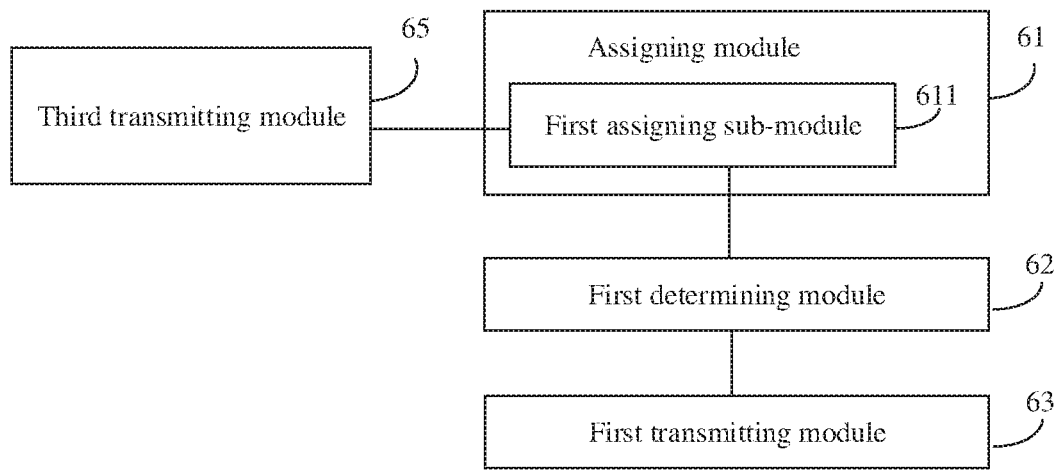
FIG. 8B is a block diagram illustrating another apparatus for assigning an identifier according to an example of the present application.

FIG. 8B is a block diagram illustrating another apparatus for assigning an identifier according to an example of the present application. As shown in FIG. 8B, on the basis of the example shown in FIG. 7A, the apparatus further includes a third transmitting module 65.

The third transmitting module 65 is configured to, in response to cell handover, transmit, to a target cell, ranges of AS QoS flow identifiers respectively usable by the master base station and the secondary base station, according to which the first assigning sub-module 611 assigns the AS QoS flow identifier.

When the cell handover occurs, the base station in the source cell, that is, the base station before the cell handover occurs, notifies the target cell about respective ranges of AS QoS flow IDs of the MgNB and SgNB. At the same time, the target cell is to be notified about the current mapping relationship between the NAS QoS flow ID and the AS QoS flow ID of the UE.

In addition, if the current QoS flow is remapped during the handover, the base station needs to provide the mapping relationship between the updated NAS QoS flow ID and the updated AS QoS flow ID to the UE.

In the above example, when the cell handover occurs, the range of AS QoS flow identifiers usable by each of the master base station and the secondary base station is transmitted to the target cell, such that the target cell base station may, based on this, assign an AS QoS flow identifier to a QoS flow.

Figure 8C:
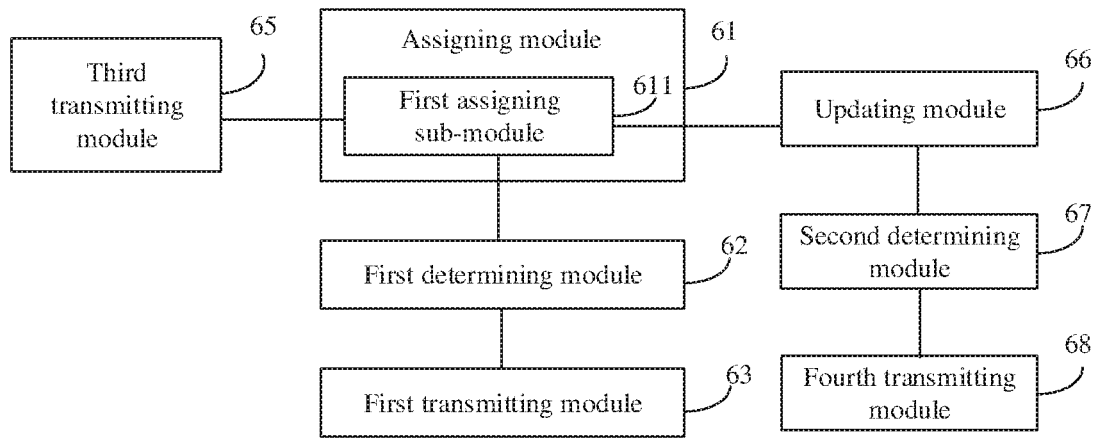
FIG. 8C is a block diagram illustrating another apparatus for assigning an identifier according to an example of the present application.

FIG. 8C is a block diagram illustrating another apparatus for assigning an identifier according to an example of the present application. As shown in FIG. 8C, on the basis of the example shown in FIG. 7A or 8B, the apparatus may further include an updating module 66, a second determining module 67 and a fourth transmitting module 68.

The updating module 66 is configured to, when the current QoS flow is remapped, update the AS QoS flow identifier for the current QoS flow according to a range of AS QoS flow identifiers usable by a cell group base station where a DRB, to which the current QoS flow is remapped, is located.

The second determining module 67 is configured to determine mapping relationship between an updated NAS QoS flow identifier and the AS QoS flow identifier updated by the updating module 66.

The fourth transmitting module 68 is configured to transmit, to the UE separately or simultaneously, the mapping relationship between the updated NAS QoS flow identifier and the updated AS QoS flow identifier determined by the second determining module 67 and an SDAP PDU with an SDAP header carrying the updated AS QoS flow identifier.

In the above example, when the current QoS flow is remapped, the AS QoS flow identifier is updated for the current QoS flow, and the mapping relationship between the updated NAS QoS flow identifier and the updated AS QoS flow identifier is determined, thus, the uniqueness of a QoS flow ID in a DRB for the same PDU session under a dual connectivity scenario is ensured. The mapping relationship and the SDAP PDU are transmitted separately or simultaneously to the UE, such that the UE may, based on this, obtain a corresponding NAS QoS flow identifier to determine the NAS QoS flow corresponding to the SDAP PDU.

Figure 8D:
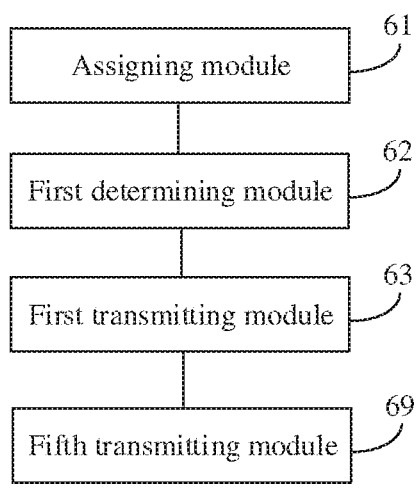
FIG. 8D is a block diagram illustrating another apparatus for assigning an identifier according to an example of the present application.

FIG. 8D is a block diagram illustrating another apparatus for assigning an identifier according to an example of the present application. As shown in FIG. 8D, on the basis of the example shown in FIG. 6, the apparatus may further include a fifth transmitting module 69.

The fifth transmitting module 69 is configured to transmit second indication information or third indication information to the UE through an RRC message, where the second indication information indicates a DRB to which uplink data of the current QoS flow is mapped, and the third indication information indicates that an SDAP PDU for all QoS flows mapped to a DRB, to which the current QoS flow is mapped, is not to include an SDAP header.

In the above example, by transmitting the second indication information or the third indication information to the UE, the UE may, based on this, delete the AS QoS flow identifier assigned to the current QoS flow or the mapping relationship between the mapping relationship between an NAS QoS flow identifier and an AS QoS flow identifier for each QoS flow mapped to the DRB, to which the current QoS flow is mapped.

Figure 9:
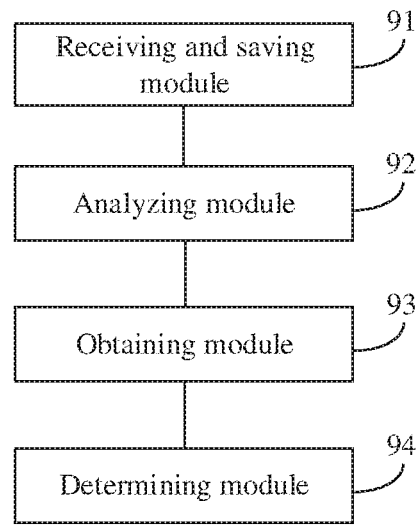
FIG. 9 is a block diagram illustrating an apparatus for determining an NAS QoS flow according to an example of the present application.

FIG. 9 is a block diagram illustrating an apparatus for determining an NAS QoS flow according to an example of the present application. The apparatus may be located in UE. As shown in FIG. 9, the apparatus includes a receiving and saving module 91, an analyzing module 92, an obtaining module 93 and a determining module 94.

The receiving and saving module 91 is configured to receive and save an SDAP PDU and mapping relationship between an NAS QoS flow identifier and an AS QoS flow identifier, which are transmitted separately or simultaneously by a base station, where the base station includes a master base station or a secondary base station, and an SDAP header of the SDAP PDU carries the AS QoS flow identifier assigned to a current QoS flow.

The analyzing module 92 is configured to analyze the SDAP PDU saved by the receiving and saving module 91.

The obtaining module 93 is configured to, in response to reading the AS QoS flow identifier assigned to the current QoS flow from the SDAP header of the SDAP PDU by the analyzing module 92, obtain a corresponding NAS QoS flow identifier according to the AS QoS flow identifier and the mapping relationship saved by the receiving and saving module.

The determining module 94 is configured to determine an NAS QoS flow corresponding to the SDAP PDU according to the NAS QoS flow identifier obtained by the obtaining module 93.

In an example, upon analyzing the received SDAP PDU, if the AS QoS flow identifier assigned to the current QoS flow is read from the SDAP header of the SDAP PDU, according to the AS QoS flow identifier and the received mapping relationship, a corresponding NAS QoS flow identifier is obtained, so that the NAS QoS flow corresponding to the SDAP PDU is determined according to the obtained NAS QoS flow identifier.

Figure 10A:
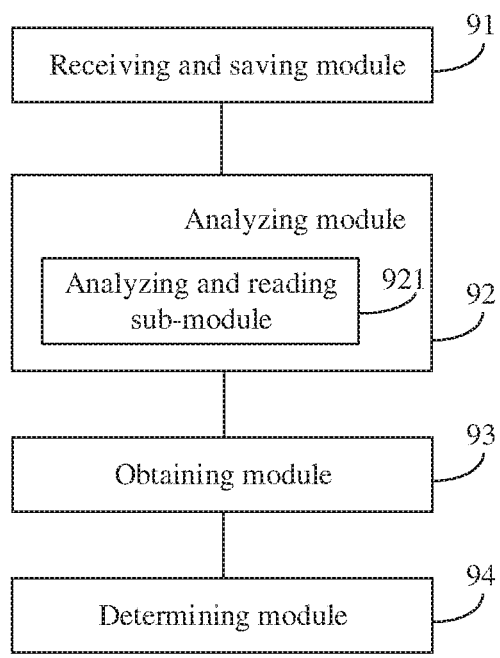
FIG. 10A is a block diagram illustrating another apparatus for determining an NAS QoS flow according to an example of the present application.

FIG. 10A is a block diagram illustrating another apparatus for determining an NAS QoS flow according to an example of the present application. As shown in FIG. 10A, on the basis of the example shown in FIG. 9, the analyzing module 92 may include an analyzing and reading sub-module 921.

The analyzing and reading sub-module 921 is configured to, in response to determining, by the analyzing, that an AS RQI field of the SDAP header has a first preset value, read the AS QoS flow identifier assigned to the current QoS flow from the SDAP header.

The UE analyzes the received SDAP PDU. If it is determined, by the analyzing, that the AS RQI field in the SDAP header has a first preset value, for example, 1, the AS QoS flow identifier assigned to the current QoS flow may be read from the SDAP header.

In the above example, if it is determined, by the analyzing, that the AS RQI field in the SDAP header has the first preset value, the AS QoS flow identifier assigned to the current QoS flow is read from the SDAP header, thereby providing a condition for subsequent obtaining an NAS QoS flow identifier.

Figure 10B:
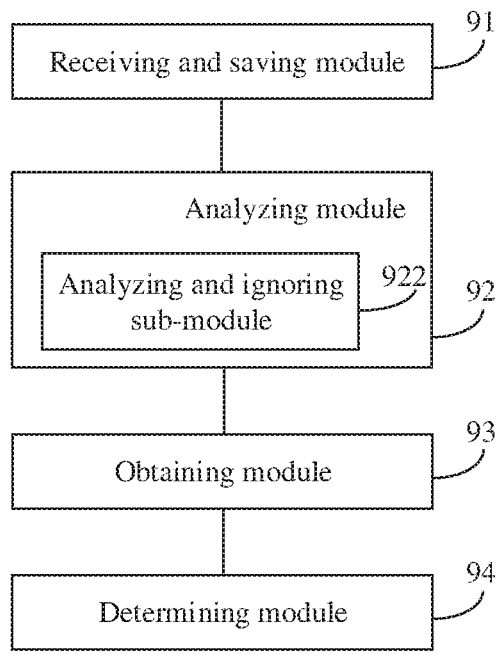
FIG. 10B is a block diagram illustrating another apparatus for determining an NAS QoS flow according to an example of the present application.

FIG. 10B is a block diagram illustrating another apparatus for determining an NAS QoS flow according to an example of the present application. As shown in FIG. 10B, on the basis of the example shown in FIG. 9, the analyzing module 92 may include an analyzing and ignoring sub-module 922.

The analyzing and ignoring sub-module 922 is configured, in response to determining, by the analyzing, that an AS RQI field of the SDAP header has a second preset value, and that the current QoS flow is not configured with an NAS reflective QoS function, not read the AS QoS flow identifier.

If it is determined, by analyzing, that the AS RQI field in the SDAP header has a second preset value, for example, 0, and the current QoS flow is not configured with the NAS reflective QoS function, the AS QoS flow identifier is not read.

In the above example, if it is determined, by analyzing, that the AS RQI field in the SDAP header has the second preset value, the AS QoS flow identifier is not read, thereby avoiding obtaining an incorrect NAS QoS flow identifier.

Figure 10C:
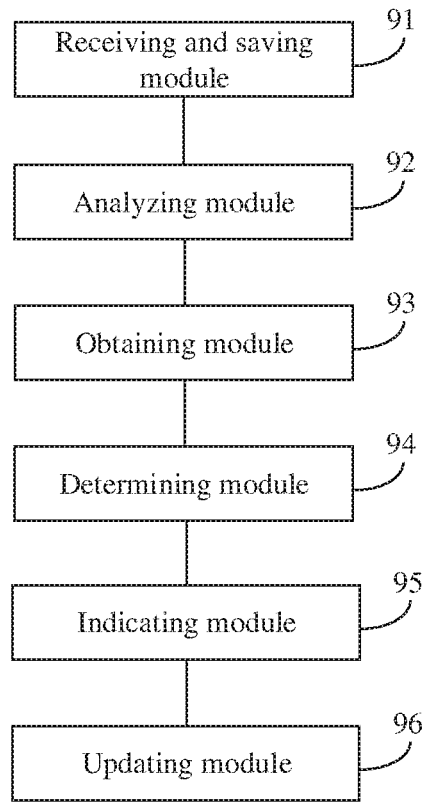
FIG. 10C is a block diagram illustrating another apparatus for determining an NAS QoS flow according to an example of the present application.

FIG. 10C is a block diagram illustrating another apparatus for determining an NAS QoS flow according to an example of the present application. As shown in FIG. 10C, on the basis of the example shown in FIG. 9, the apparatus may further include: an indicating module 95 and an updating module 96.

The indicating module 95 is configured to, after the determining module determines the NAS QoS flow corresponding to the SDAP PDU according to the obtained NAS QoS flow identifier, indicate an NAS RQI and the corresponding NAS QoS flow identifier to an NAS.

The updating module 96 is configured to, in response to determining that an AS RQI field of the SDAP header has a first preset value, update, by an AS, mapping relationship between uplink data of the current QoS flow and a DRB.

After determining the NAS QoS flow corresponding to the SDAP PDU, the UE may indicate, to the NAS, the NAS RQI and the corresponding NAS QoS flow ID. If it is determined, by analyzing, that the AS RQI field in the SDAP header has the first preset value, for example, 1, the mapping relationship between the uplink data of the current QoS flow and the DRB may be updated by the AS.

It should be noted that in the example, in addition to the uplink data of the current QoS flow explicitly indicated, current QoS flows elsewhere refer to downlink data of the current QoS flow.

In the above example, by indicating, to the NAS, the NAS RQI and the corresponding NAS QoS flow identifier, the NAS may perform corresponding operations based on this. And when it is determined, by analyzing, that the AS RQI field in the SDAP header has the first preset value, the mapping relationship between the uplink data of the current QoS flow and the DRB is updated by the AS. Thus, a correct NAS QoS flow identifier may be obtained based on this, and thereby the NAS QoS flow corresponding to the SDAP PDU may be correctly determined.

Figure 10D:
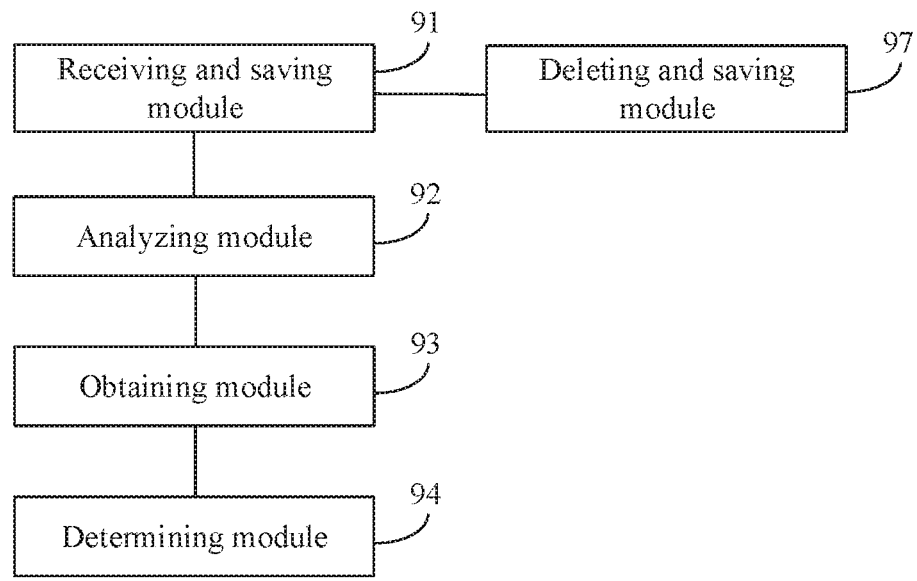
FIG. 10D is a block diagram illustrating another apparatus for determining an NAS QoS flow according to an example of the present application.

FIG. 10D is a block diagram illustrating another apparatus for determining an NAS QoS flow according to an example of the present application. As shown in FIG. 10D, on the basis of the example shown in FIG. 9, the apparatus may further include a deleting and saving module 97.

The deleting and saving module 97 is configured to, after the receiving and saving module receives and saves the mapping relationship between the NAS QoS flow identifier and the AS QoS flow identifier which is transmitted by the base station, in response to receiving mapping relationship between an updated NAS QoS flow identifier and an updated AS QoS flow identifier, delete the mapping relationship between the NAS QoS flow identifier and the AS QoS flow identifier, and save the mapping relationship between the updated NAS QoS flow identifier and the updated AS QoS flow identifier.

In the above example, if the mapping relationship between the updated NAS QoS flow identifier and the updated AS QoS flow identifier is received, the mapping relationship between the NAS QoS flow identifier and the AS QoS flow identifier is deleted, and the mapping relationship between the updated NAS QoS flow identifier and the updated AS QoS flow identifier is saved, thereby providing a condition for subsequent obtaining an NAS QoS flow identifier.

Figure 10E:
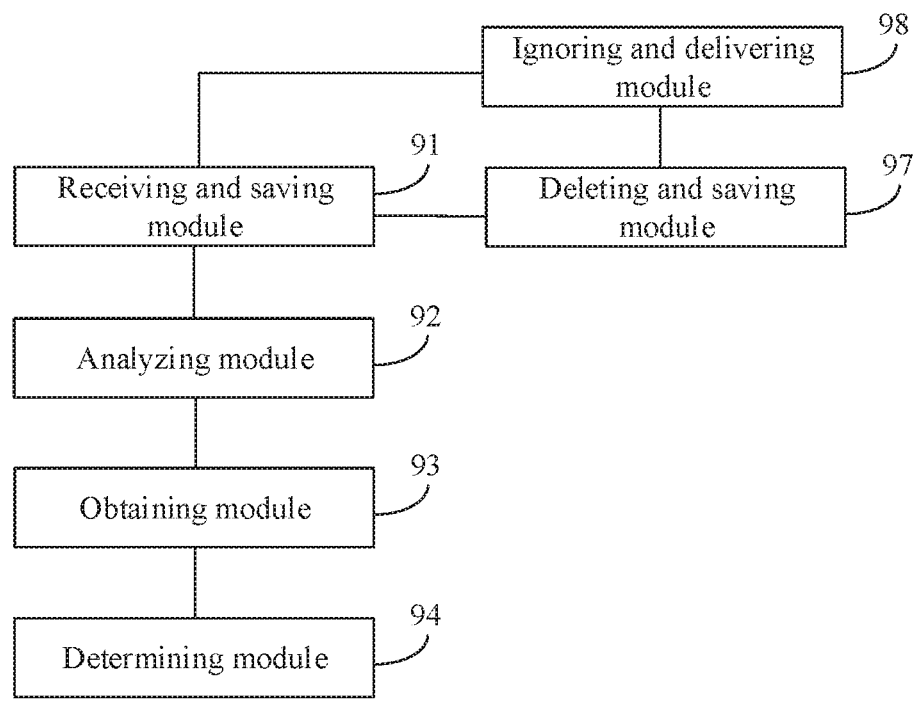
FIG. 10E is a block diagram illustrating another apparatus for determining an NAS QoS flow according to an example of the present application.

FIG. 10E is a block diagram illustrating another apparatus for determining an NAS QoS flow according to an example of the present application. As shown in FIG. 10E, on the basis of the example shown in FIG. 9 or OD, the apparatus may further include an ignoring and delivering module 98.

The ignoring and delivering module 98 is configured to, when the AS QoS flow identifier assigned to the current QoS flow is not found from the mapping relationship saved by the receiving and saving module 91 or the deleting and saving module 97, ignore the AS QoS flow identifier assigned to the current QoS flow, and deliver data in the SDAP PDU to an upper layer.

In the above example, when the AS QoS flow identifier assigned to the current QoS flow is not found, the AS QoS flow identifier assigned to the current QoS flow is ignored, and the data in the SDAP PDU is delivered to an upper layer, thereby avoiding obtaining an incorrect NAS QoS flow identifier and ensuring transmission of data.

Figure 10F:
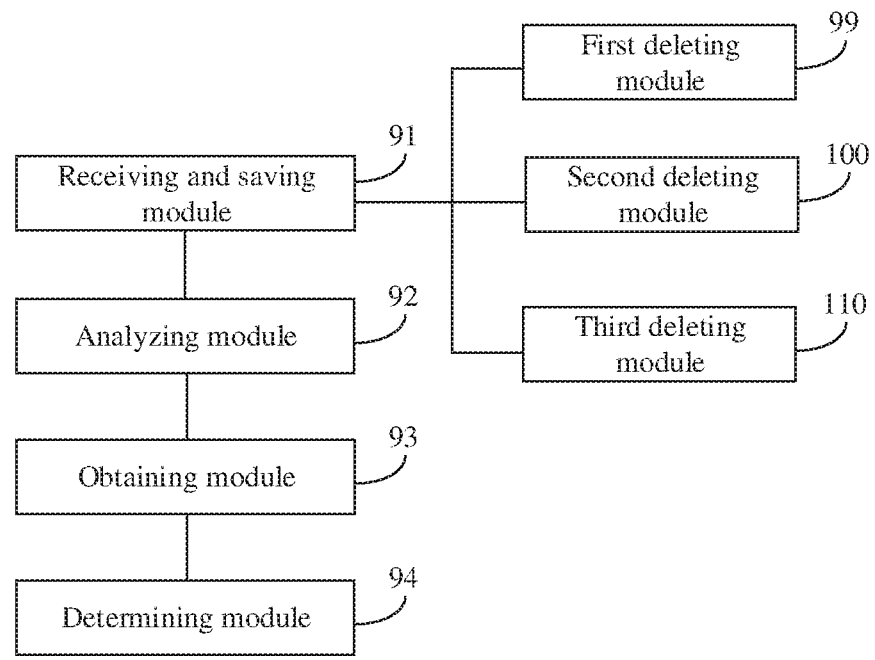
FIG. 10F is a block diagram illustrating another apparatus for determining an NAS QoS flow according to an example of the present application.

FIG. 10F is a block diagram illustrating another apparatus for determining an NAS QoS flow according to an example of the present application. As shown in FIG. 10F, on the basis of the example shown in FIG. 9, the apparatus may further include a first deleting module 99, a second deleting module 100, or a third deleting module 110.

The first deleting module 99 is configured to, in response to receiving second indication information indicating a DRB to which uplink data of the current QoS flow is mapped, delete the AS QoS flow identifier assigned to the current QoS flow that is saved by the receiving and saving module 91 when the current QoS flow is not configured with an NAS reflective QoS function.

The second deleting module 100 is configured to, in response to receiving the second indication information indicating the DRB to which the uplink data of the current QoS flow is mapped, delete the AS QoS flow identifier assigned to the current QoS flow that is saved by the receiving and saving module 91 when the current QoS flow is not configured with an AS reflective QoS function.

The third deleting module 110 is configured to, in response to receiving third indication information indicating that an SDAP PDU for all QoS flows mapped to a DRB, to which the current QoS flow is mapped, is not to include an SDAP header, delete the mapping relationship between an NAS QoS flow identifier and an AS QoS flow identifier for each QoS flow mapped to the DRB, to which the current QoS flow is mapped, that is saved by the receiving and saving module 91.

In the above example, by receiving the second indication information or the third indication information transmitted by the base station, based on this, it is possible to delete the AS QoS flow identifier assigned to the current QoS flow or the mapping relationship between an NAS QoS flow identifier and an AS QoS flow identifier for each QoS flow mapped to the DRB, to which the current QoS flow is mapped, thereby avoiding obtaining an incorrect NAS QoS flow identifier.

Figure 11:
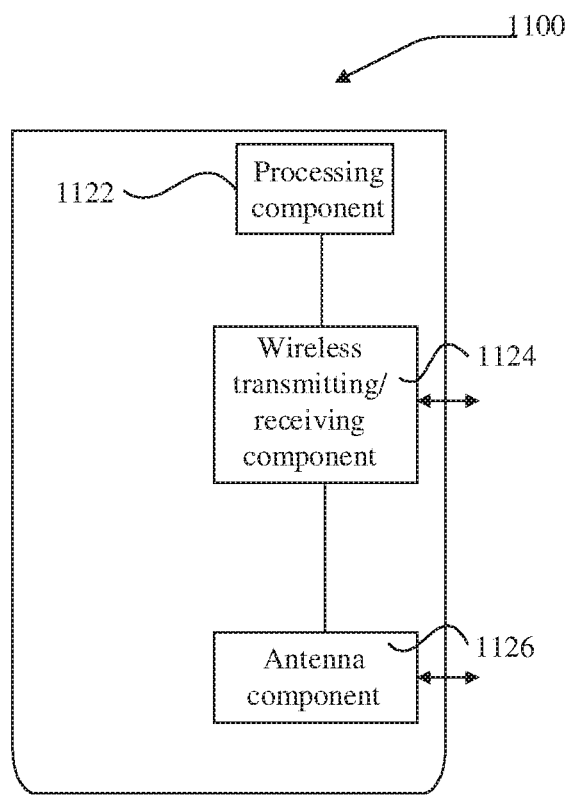
FIG. 11 is a block diagram illustrating an apparatus suitable for assigning an identifier according to an example of the present application.

FIG. 11 is a block diagram illustrating an apparatus applicable to identifier allocation according to an example of the present application. The apparatus 1100 may be provided to a base station. The base station may be a master base station or a secondary base station. Referring to FIG. 11, the apparatus 1100 includes a processing component 1122, a wireless transmitting/receiving component 1124, an antenna component 1126, and a signal processing portion specific to a wireless interface. The processing component 1122 may further include one or more processors.

One of the processors in the processing component 1122 may be configured to:
  assign an AS QoS flow identifier to a current QoS flow;
  determine mapping relationship between an NAS QoS flow identifier and the AS QoS flow identifier; and
  transmit the mapping relationship and an SDAP PDU separately or simultaneously to UE, where an SDAP header of the SDAP PDU carries the AS QoS flow identifier assigned to the current QoS flow.

In an example, there is also provided a non-transitory computer-readable storage medium including instructions, where the instructions are executable by the processing component 1122 of the apparatus 1100 to implement a method of assigning an identifier as described above. For example, the non-transitory computer-readable storage medium may be a ROM, a random access memory (RAM), a CD-ROM, a magnetic tape, a floppy disk, and an optical data storage device.

Figure 12:
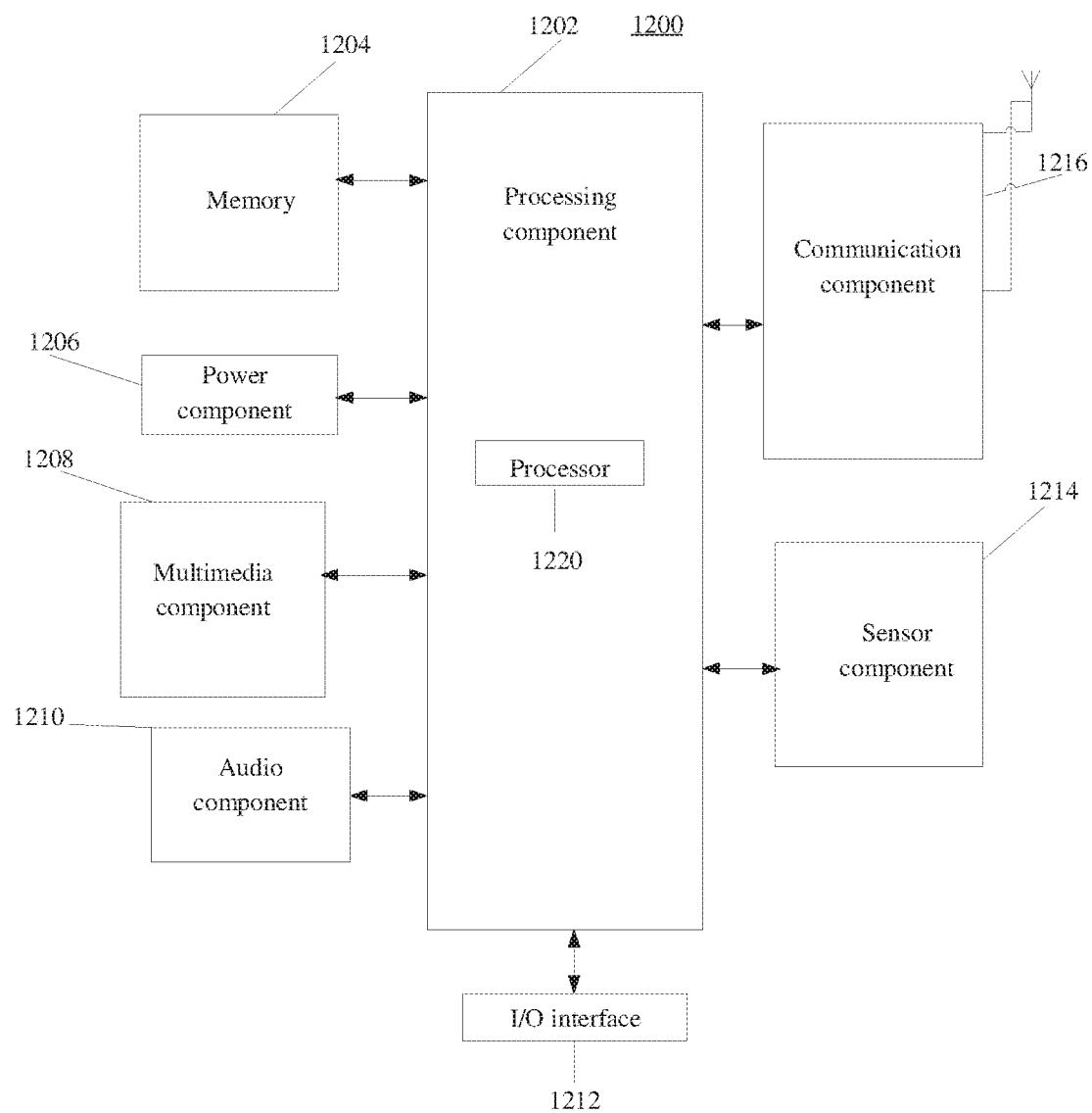
FIG. 12 is a block diagram illustrating an apparatus suitable for determining an NAS QoS flow according to an example of the present application.

FIG. 12 is a block diagram illustrating an apparatus applicable to identifier allocation according to an example of the present application. For example, the apparatus 1200 may be a mobile phone, a computer, a digital broadcast terminal, a messaging device, a game console, a tablet device, a medical equipment, a fitness equipment, a personal digital assistant or other user equipment.

Referring to FIG. 12, the apparatus 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 usually controls the overall operation of the apparatus 1200, such as operations associated with display, telephone calls, data communications, camera operations, and recording operations. The processing component 1202 may include one or more processors 1220 to execute instructions to perform all or part of the steps in the methods described above. Moreover, the processing component 1202 may include one or more modules to facilitate interaction between the processing component 1202 and other components. For example, the processing component 1202 may include a multimedia module to facilitate interaction between the multimedia component 1208 and the processing component 1202.

One of the processors 1220 in the processing component 1202 may be configured to:

receive and save an SDAP PDU and mapping relationship between an NAS QoS flow identifier and an AS QoS flow identifier, which are transmitted separately or simultaneously by a base station, where the base station includes a master base station or a secondary base station, and an SDAP header of the SDAP PDU carries the AS QoS flow identifier assigned to a current QoS flow;

analyze the SDAP PDU;

in response to reading the AS QoS flow identifier assigned to the current QoS flow from the SDAP header of the SDAP PDU, obtain a corresponding NAS QoS flow identifier according to the AS QoS flow identifier and the mapping relationship; and determine an NAS QoS flow corresponding to the SDAP PDU according to the obtained NAS QoS flow identifier.

The memory 1204 is configured to store various types of data to support operation at the apparatus 1200. Examples of these data include instructions for any application or method operating at the apparatus 1200, contact data, phone book data, messages, pictures, videos, and the like. The memory 1204 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 1206 provides power to various components of the apparatus 1200. The power component 1206 may include a power management system, one or more power sources, and other components associated with power generated, managed, and distributed for the apparatus 1200.

The multimedia component 1208 includes a screen that provides an output interface between the apparatus 1200 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1208 includes a front camera and/or a rear camera. When the apparatus 1200 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1210 is configured to output and/or input audio signals. For example, the audio component 1210 includes a microphone (MIC) configured to receive an external audio signal when the apparatus 1200 is in an operation mode, such as a call mode, a recording mode, and a voice recognition mode. The received audio signal may be further stored in the memory 1204 or transmitted via the communication component 1216. In some examples, the audio component 1210 also includes a loudspeaker for outputting an audio signal.

The I/O interface 1212 provides an interface between the processing component 1202 and a peripheral interface module which may be a keyboard, a click wheel, a button, or the like. These buttons may include, but are not limited to a home button, a volume button, a start button, and a lock button.

The sensor component 1214 includes one or more sensors for providing a status assessment in various aspects to the apparatus 1200. For example, the sensor component 1214 may detect an open/closed state of the apparatus 1200, and the relative positioning of components, for example, the component is a display and a keypad of the apparatus 1200. The sensor component 1214 may also detect a change in position of the apparatus 1200 or a component of the apparatus 1200, the presence or absence of a user in contact with the apparatus 1200, the orientation or acceleration/deceleration of the apparatus 1200 and a change in temperature of the apparatus 1200. The sensor component 1214 may include a proximity sensor configured to detect the presence of nearby objects without any physical contact. The sensor component 1214 may also include a light sensor, such as a CMOS or CCD image sensor, for use in imaging applications. In some examples, the sensor component 1214 may also include an acceleration sensor, a gyro sensor, a magnetic sensor, a pressure sensor, or a temperature sensor.

The communication component 1216 is configured to facilitate wired or wireless communication between the apparatus 1200 and other devices. The apparatus 1200 may access a wireless network based on a communication standard, such as WiFi, 2G or 3G, or a combination thereof. In an example, the communication component 1216 receives broadcast signals or broadcast associated information from an external broadcast management system via a broadcast channel. In an example, the communication component 1216 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 1200 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an example, there is also provided a non-transitory computer-readable storage medium including instructions, such as a memory 1204 including instructions, where the instructions are executable by the processor 1220 of the apparatus 1200 to implement the method as described above. For example, the non-transitory computer-readable storage medium may be a ROM, a random access memory (RAM), a CD-ROM, a magnetic tape, a floppy disk, and an optical data storage device.

For the apparatus examples, since they basically correspond to the method examples, reference may be made to the partial description of the method examples. The apparatus examples described above are merely illustrative, where the units described as separate components may or may not be physically separated, and the components displayed as units may or may not be physical units, i.e., may be located in one place or may be distributed to multiple network units. Some or all of the modules may be selected according to actual needs to achieve the objectives of the present disclosure. Those of ordinary skill in the art can understand and implement the present disclosure without any creative effort.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

Other embodiments of the present disclosure will be readily apparent to those skilled in the art after considering the specification and practicing the contents disclosed herein. The present application is intended to cover any variations, uses, or adaptations of the preset disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

The invention claimed is:

1. A method of assigning an identifier, being applied to a base station comprising a master base station or a secondary base station, the method comprising:
assigning an Access Stratum (AS) Quality of Service (QoS) flow identifier to a current QoS flow;
determining mapping relationship between a Non-Access Stratum (NAS) QoS flow identifier and the AS QoS flow identifier; and
transmitting the mapping relationship and a Service Data Adaptation Protocol (SDAP) Packet Data Unit (PDU) separately or simultaneously to user equipment (UE), wherein an SDAP header of the SDAP PDU carries the AS QoS flow identifier assigned to the current QoS flow.

2. The method according to claim 1, wherein the assigning of the AS QoS flow identifier to the current QoS flow comprises:
when it is configured for the UE that an SDAP PDU for all QoS flows mapped to a Data Radio Bearer (DRB), to which the current QoS flow is mapped, is to comprise an SDAP header, according to a pre-agreed or pre-negotiated range of AS QoS flow identifiers usable by a cell group base station where the DRB is located, assigning AS QoS flow identifiers to respective ones of all the QoS flows in the DRB or to a QoS flow in the DRB that is to be configured with an AS reflective QoS function or an NAS reflective QoS function.

3. The method according to claim 2, wherein the assigning of the AS QoS flow identifier to the current QoS flow further comprises:
when it is configured for the UE that the SDAP PDU for all QoS flows mapped to the DRB, to which the current QoS flow is mapped, is to comprise the SDAP header, assigning any unassigned AS QoS flow identifier, a preset value or a reserved value to a QoS flow that is not configured with the AS reflective QoS function or the NAS reflective QoS function.

4. The method according to claim 2, further comprising:
in response to cell handover, transmitting, to a target cell, ranges of AS QoS flow identifiers respectively usable by the master base station and the secondary base station.

5. The method according to claim 2, further comprising:
when the current QoS flow is remapped, updating the AS QoS flow identifier for the current QoS flow according to a range of AS QoS flow identifiers usable by a cell group base station where a DRB, to which the current QoS flow is remapped, is located;
determining mapping relationship between an updated NAS QoS flow identifier and the updated AS QoS flow identifier; and
transmitting the mapping relationship between the updated NAS QoS flow identifier and the updated AS QoS flow identifier and an SDAP PDU with an SDAP header carrying the updated AS QoS flow identifier, separately or simultaneously, to the UE.

6. The method according to claim 1, wherein the assigning of the AS QoS flow identifier to the current QoS flow comprises:
when it is configured for the UE that an SDAP PDU for all QoS flows mapped to a DRB, to which the current QoS flow is mapped, is to comprise an SDAP header, transmitting to another base station an AS QoS flow identifier request message for all of the QoS flows in the DRB or for a QoS flow in the DRB that is to be configured with an AS reflective QoS function or an NAS reflective QoS function;
receiving an AS QoS flow identifier returned by the another base station; and
assigning the received AS QoS flow identifier to a corresponding QoS flow.

7. The method according to claim 1, further comprising:
when transmitting the mapping relationship and the SDAP PDU separately or simultaneously to the UE, transmitting to the UE first indication information indicating that the current QoS flow enables at least one of an AS reflective QoS function or an NAS reflective QoS function.

8. The method according to claim 1, further comprising:
in response to cell handover, transmitting, to a target cell, the mapping relationship currently transmitted to the UE.

9. The method according to claim 1, further comprising:
transmitting second indication information or third indication information to the UE through a radio resource control (RRC) message, wherein the second indication information indicates a DRB to which uplink data of the current QoS flow is mapped, and the third indication information indicates that an SDAP PDU for all QoS flows mapped to a DRB, to which the current QoS flow is mapped, is not to comprise an SDAP header.

10. A base station, comprising:
a processor; and
a memory for storing instructions executable by the processor,
wherein the processor is configured to perform the method according to claim 1.

11. A method of determining a Non-Access Stratum (NAS) Quality of Service (QoS) flow, being applied to user equipment (UE), the method comprising:
receiving and saving a Service Data Adaptation Protocol (SDAP) Packet Data Unit (PDU) and mapping relationship between an NAS QoS flow identifier and an Access Stratum (AS) QoS flow identifier, which are transmitted separately or simultaneously by a base station, wherein the base station comprises a master base station or a secondary base station, and an SDAP header of the SDAP PDU carries the AS QoS flow identifier assigned to a current QoS flow;
analyzing the SDAP PDU;
in response to reading the AS QoS flow identifier assigned to the current QoS flow from the SDAP header of the SDAP PDU, obtaining a corresponding NAS QoS flow identifier according to the AS QoS flow identifier and the mapping relationship; and
determining an NAS QoS flow corresponding to the SDAP PDU according to the obtained NAS QoS flow identifier.

12. The method according to claim 11, wherein the analyzing of the SDAP PDU comprises:
in response to determining, by the analyzing, that an AS Reflective QoS Indicator (RQI) field of the SDAP header has a first preset value, reading the AS QoS flow identifier assigned to the current QoS flow from the SDAP header.

13. The method according to claim 11, wherein the analyzing of the SDAP PDU comprises:
in response to determining, by the analyzing, that an AS RQI field of the SDAP header has a second preset value, and that the current QoS flow is not configured with an NAS reflective QoS function, not reading the AS QoS flow identifier.

14. The method according to claim 11, further comprising:
after determining the NAS QoS flow corresponding to the SDAP PDU according to the obtained NAS QoS flow identifier, indicating an NAS RQI and the corresponding NAS QoS flow identifier to an NAS; and
in response to determining, by the analyzing, that an AS RQI field of the SDAP header has a first preset value, updating, by an AS, mapping relationship between uplink data of the current QoS flow and a Data Radio Bearer (DRB).

15. The method according to claim 11, further comprising:
after receiving and saving the mapping relationship between the NAS QoS flow identifier and the AS QoS flow identifier which is transmitted by the base station, in response to receiving mapping relationship between an updated NAS QoS flow identifier and an updated AS QoS flow identifier, deleting the mapping relationship between the NAS QoS flow identifier and the AS QoS flow identifier, and saving the mapping relationship between the updated NAS QoS flow identifier and the updated AS QoS flow identifier.

16. The method according to claim 11, further comprising:
when the AS QoS flow identifier assigned to the current QoS flow is not found from the mapping relationship, ignoring the AS QoS flow identifier assigned to the current QoS flow, and delivering data in the SDAP PDU to an upper layer.

17. The method according to claim 11, further comprising one of:
in response to receiving second indication information indicating a DRB to which uplink data of the current QoS flow is mapped, deleting the AS QoS flow identifier assigned to the current QoS flow when the current QoS flow is not configured with an NAS reflective QoS function;
in response to receiving the second indication information indicating the DRB to which the uplink data of the current QoS flow is mapped, deleting the AS QoS flow identifier assigned to the current QoS flow when the current QoS flow is not configured with an AS reflective QoS function; or
in response to receiving third indication information indicating that an SDAP PDU for all QoS flows mapped to a DRB, to which the current QoS flow is mapped, is not to comprise an SDAP header, deleting the mapping relationship between an NAS QoS flow identifier and an AS QoS flow identifier for each QoS flow mapped to the DRB, to which the current QoS flow is mapped.

18. User equipment, comprising:
a processor; and
a memory for storing instructions executable by the processor,
wherein the processor is configured to:
receive and save a Service Data Adaptation Protocol (SDAP) Packet Data Unit (PDU) and mapping relationship between a Non-Access Stratum (NAS) Quality of Service (QoS) flow identifier and an Access Stratum (AS) QoS flow identifier, which are transmitted separately or simultaneously by a base station, wherein the base station comprises a master base station or a secondary base station, and an SDAP header of the SDAP PDU carries the AS QoS flow identifier assigned to a current QoS flow;
analyze the SDAP PDU;
in response to reading the AS QoS flow identifier assigned to the current QoS flow from the SDAP header of the SDAP PDU, obtain a corresponding NAS QoS flow identifier according to the AS QoS flow identifier and the mapping relationship; and
determine an NAS QoS flow corresponding to the SDAP PDU according to the obtained NAS QoS flow identifier.

* * * * *